US006760521B2

(12) United States Patent
Watanabe

(10) Patent No.: US 6,760,521 B2
(45) Date of Patent: Jul. 6, 2004

(54) WAVELENGTH CORRECTION METHOD AND APPARATUS, WAVELENGTH CHECK METHOD AND APPARATUS, ARRAYED WAVEGUIDE DIFFRACTION GRATING, AND INTERLEAVER

(75) Inventor: Shinya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/142,984

(22) Filed: May 13, 2002

(65) Prior Publication Data

US 2002/0168146 A1 Nov. 14, 2002

(30) Foreign Application Priority Data

May 14, 2001 (JP) ........................................ 2001-143594

(51) Int. Cl.[7] .............................. G02B 6/26; G02B 6/42
(52) U.S. Cl. ............................ 385/50; 385/15; 385/24; 385/27; 385/37; 385/48; 385/52
(58) Field of Search ............................ 385/15, 24, 27, 385/37, 48, 50, 52

(56) References Cited

U.S. PATENT DOCUMENTS 6,490,395 B1 * 12/2002 Nara et al. ..................... 385/39
2001/0055444 A1 * 12/2001 Kashihara et al. ............ 385/37

FOREIGN PATENT DOCUMENTS

| JP | 09-049936 | 2/1997 | ........... G02B/6/122 |
| JP | 11-038239 | 2/1999 | ............ G02B/6/12 |

OTHER PUBLICATIONS

P.C. Clemens et al., "Wavelength–Adaptable Optical Phased Array in SiO2–Si", IEEE Photonics Technology Letters, vol. 7, No. 10, Oct. 1995, pp. 1–2.

* cited by examiner

*Primary Examiner*—Brian Healy
*Assistant Examiner*—Daniel Petkovsek
(74) *Attorney, Agent, or Firm*—McGinn & Gibb, PLLC

(57) ABSTRACT

According to this invention, there are provided a wavelength correction method and apparatus which can easily correct the wavelength characteristics of an optical element such as an arrayed waveguide diffraction grating in a slab waveguide or another waveguide, and a wavelength check method and apparatus which check the quality of a waveguide. A center wavelength $\lambda 0$ of light having a predetermined wavelength $\lambda$, emitted from a light source, is obtained at the initial position of an input-side slab waveguide which is cut into a first input-side waveguide component and a second input-side waveguide component. When a light component having a first wavelength $\lambda s$ on the short wavelength side and a light component having a second wavelength $\lambda 1$ on the long wavelength side, centered on a desired wavelength $\lambda g$, are sequentially output from the light source, the amount of each light component is measured while the relative position of the input-side slab waveguide is changed. The positional relationship between the first and second input-side waveguide components is fixed to the relative position of the two components at which the levels of light components from them coincide with each other. In this manner, the center wavelength $\lambda g$ can be easily corrected.

20 Claims, 12 Drawing Sheets

INITIAL POSITION

WAVELENGTH CORRECTION METHOD AND APPARATUS, WAVELENGTH CHECK METHOD AND APPARATUS, ARRAYED WAVEGUIDE DIFFRACTION GRATING, AND INTERLEAVER

BACKGROUND OF THE INVENTION

1. Field of the Invention

The present invention relates to an optical communication technique and, more particularly, to a wavelength correction method and apparatus, wavelength check method and apparatus, which are used to correct the center wavelength output from an optical element, e.g., an arrayed waveguide diffraction grating having a slab waveguide, to a target value, when light is input to the optical element, a wavelength-corrected arrayed waveguide diffraction grating, and an interleaver.

2. Description of the Prior Art

A demand has arisen for an increase in transmission capacity in an optical fiber communication system as well as an increase in the volume of data transmitted. For this reason, a great deal of attention has been paid to DWDM (Dense Waveguide Division Multiplexing), and greater importance has been attached to optical elements such as an optical waveguide filter serving as a multiplexing/demultiplexing device for dividing/combining wavelengths.

Optical wavelength filters take various forms. Among these filters, an arrayed waveguide diffraction grating has wavelength characteristics represented by a narrow band and high extinction ratio, and also has characteristics as a multi-input/multi-output filter device. Therefore, this device allows demultiplexing a multiplexed signal or reverse operation, and hence allows easy formation of a wavelength multiplexing/demultiplexing device. In addition, if an arrayed waveguide diffraction grating is formed by using a quartz waveguide, good coupling to an optical fiber is ensured, and low insertion loss operation with an insertion loss of about several dB (decibel) can be realized. Owing to these advantages, among optical wavelength filters, an arrayed waveguide diffraction grating has attracted a great deal of attention as an important device and has been vigorously studied worldwide.

FIG. 1 shows the overall arrangement of a conventional arrayed waveguide diffraction grating. An arrayed waveguide diffraction grating 11 is comprised of one or a plurality of input waveguides 12 formed on a substrate (not shown), a plurality of output waveguides 13, a channel waveguide array 14 having waveguides bent at different curvatures, an input-side slab waveguide 15 which connects the input waveguides 12 to the channel waveguide array 14, and an output-side slab waveguide 16 which connects the channel waveguide array 14 to the output waveguides 13. The traveling path of multiplexed signal light incident from the input waveguides 12 is expanded by the input-side slab waveguide 15. The respective light components are then incident on the channel waveguide array 14 in equiphase. These incident light components vary in intensity at the respective incident positions in the input-side slab waveguide 15; the intensities increase toward the center, exhibiting an almost Gaussian distribution.

Predetermined optical path length differences are set among the respective arrayed waveguides constituting the channel waveguide array 14 such that the optical path lengths sequentially increase or decrease. Therefore, light components guided along the respective waveguides reach the output-side slab waveguide 16 with phase differences at predetermined intervals. In practice, owing to wavelength dispersion, equiphase planes tilt depending on the wavelengths. As a result, light components are imaged (focused) at different positions on the interfaces between the output-side slab waveguide 16 and the output waveguides 13 depending on the wavelengths. Since the output waveguides 13 are arranged at the respective positions corresponding to the wavelengths, arbitrary wavelength components can be extracted from the output waveguides 13.

The center wavelength of the arrayed waveguide diffraction grating 11 is very sensitive to a change in the refractive index of a waveguide material. In some case, therefore, the center wavelength varies due to variations in a film formation process as a manufacturing process, and the design value cannot be obtained. If the center wavelength varies, a high optical loss occurs at the wavelength used.

According to Japanese Unexamined Patent Publication No. 9-49936, therefore, input/output waveguides for wavelength correction are provided in addition to general input/output waveguides formed from AWGs (arrayed waveguides). The input/output waveguides are changed in accordance with the correction amount of wavelength.

If an angle difference in a demultiplexing direction with respect to a wavelength difference $\delta\lambda$ is represented by $\delta\theta$, a center wavelength $\lambda n$ can be corrected by the value given by equation (1) by changing the positions of the input waveguides 12 in the arrayed waveguide diffraction grating, i.e., a slab incident angle $\theta$ in.

$$\delta\lambda in = (\delta\lambda/\delta\theta)\cdot\theta in \tag{1}$$

These input/output waveguides for wavelength correction are, however, discretely arranged, resulting in discrete wavelength correction amounts. This makes it impossible to correct the wavelength to an arbitrary wavelength. In order to obtain an arbitrary wavelength correction amount, the slab incident angle $\theta$in must be set to an arbitrary value.

FIG. 2 shows the arrangement of an arrayed waveguide diffraction grating designed to solve such a problem. According to, for example, the technique disclosed in "P. CPU. Clements et al., IEEE, Photon, Tech, lett, Vol. 7, No. 10, pp. 1040–1041, 1995", a substrate is cut at a slab incident portion 22 on the input side of an AWG (arrayed waveguide) wafer 21. An input fiber 24 clamped between glass members 23 is bonded (fixed) to the slab incident portion 22 reinforced by a glass member. At the time of this bonding operation, centering is directly performed to arbitrarily change the position of the input fiber 24 in accordance with a wavelength correction amount.

FIG. 3 shows how slab centering is performed by this proposed arrayed waveguide diffraction grating. An ASE (Amplified Spontaneous Emission) light source 31 is connected to the input side of an input waveguide 12. The ASE light source 31 has wide-band wavelength characteristics like a white light source. The light output from the ASE light source 31 is incident from the input waveguide 12 onto the input-side slab waveguide 15. The input-side slab waveguide 15 is cut in a direction almost perpendicular to the optical axis and separated into a first input-side waveguide component 15A and second input-side waveguide component 15B.

A spectrum analyzer 32 is connected to the output side of the output waveguide 13 to measure a wavelength. Prior to this measurement, the spectrum analyzer 32 is directly connected to the ASE light source 31 without the mediacy of the arrayed waveguide diffraction grating to measure the amounts of light output the light source at the respective wavelengths in advance. In this state, measurement is started on the light output from a port of output waveguides 13 to which the spectrum analyzer 32 is connected. Measurement is performed while the relative position of the first input-side waveguide component 15A and second input-side waveguide component 15B is moved little by little in the direction as indicated by an arrow 33 in FIG. 3. The measured values are compared with the measurement results obtained while the arrayed waveguide diffraction grating is not connected to the ASE light source 31, and the differences are taken into consideration. The respective output light amounts are discriminated as specific values for the respective wavelengths to obtain a center wavelength, thereby correcting a wavelength shift.

Since the spectrum analyzer 32 is relatively expensive, such measurement is repeated while different ports are connected one by one. Theoretically, if the wavelength is corrected at one port, correction is done in all the channels of the arrayed waveguide diffraction grating. In practice, however, even if the center wavelength is corrected in one channel, the center wavelengths in the remaining channels are not necessarily corrected at the same time owing to fluctuations and the like in a manufacturing process. For this reason, similar measurement is performed at all ports to obtain the relative position of the first input-side waveguide component 15A and second input-side waveguide component 15B at which the wavelength shift becomes minimum, thereby completing wavelength correction. In a case of an arrayed waveguide diffraction grating having 40 channels, similar measurement is repeated for 40 ports. It therefore takes much time to perform such accurate wavelength correction.

Such a conventional wavelength correction method or apparatus has the problem of insufficient wavelength correction precision. The spectrum analyzer 32 analyzes wavelengths by using a diffraction grating (not shown) to extract a wavelength within a specific range using a slit having a finite width, and measures the light amount at the corresponding portion. The set slit width therefore becomes the limit value of wavelength resolution. This is called resolving power. At the present time, the resolving power is about 10 pm (picometer) to 15 pm. Wavelength correction cannot be done with precision exceeding this resolving power.

The slit is driven by a driving system such as a motor. Mechanical errors such as the flexure of a gear inevitably occur in the driving system. As a result, a subtle difference is produced between a wavelength as a control target and an actually controlled wavelength. This difference originates from the linearity, reproducibility, or absolute precision of the characteristics of mechanical parts. The limit of the practical attainable precision of a wavelength correction apparatus is about 30 pm. Even if, therefore, attempts are made to suppress the precision of the center wavelength of an arrayed waveguide diffraction grating to 5 pm or less, it is difficult to realize it.

The problems posed in measurement using the wide-band ASE light source 31 have been described above. A tunable wavelength light source which changes its output wavelength can be used in place of such a wide-band light source. In this case, a power meter is used in place of the spectrum analyzer 32 to measure an output light amount while shifting an input wavelength. Therefore, the problem of low resolving power, which occurs when the spectrum analyzer 32 is used, can be solved. In addition, wavelength correction can be done with sufficient precision by changing the relative position of the first input-side waveguide component 15A and second input-side waveguide component 15B while changing the wavelength of the tunable wavelength light source with high precision.

When wavelength correction is to be performed by the latter method using the tunable wavelength light source, a light amount is measured by the power meter by using a predetermined wavelength while the first input-side waveguide component 15A and second input-side waveguide component 15B are set to a given relative position. Subsequently, the wavelength is shifted little by little, and light amount measurement is repeated at each wavelength. Unlike in the former method using a wide-band light source and spectrum analyzer, in the latter method, the operation of setting a new wavelength and measuring a light amount must be repeated finely in the entire range of measurement wavelengths. The shift amount of wavelength is kept observed. When the center wavelength coincides with the target wavelength at a given relative position, the correction is terminated.

Obviously, the above description is made on correcting operation for one channel. Even if the center wavelength is corrected in one channel, it does not necessarily indicate that optimal correction is made in the remaining channels, because there are errors in a manufacturing process. In the latter correction method using a tunable wavelength light source, therefore, similar correcting operation must be repeated for the remaining channels. Finally, the relative position of the first input-side waveguide component 15A and second input-side waveguide component 15B is determined. Although a center wavelength can be corrected with sufficient precision by the latter correction method, it takes a very long period of time to perform correction.

In general, the time required for correction corresponds to the value obtained by multiplying the sum of the time required for movement between slab waveguides and the time required for measurement of a spectrum by the number of times the slab waveguide is moved. Assume that an optical power meter is used. In this case, even if the net time required for each measurement is about 1 sec, the operation of moving the optical power meter to the next measurement position must be repeated by the number of times the slab waveguide is moved. In practice, therefore, the time required for measurement for one arrayed waveguide diffraction grating is 5 min or more.

The above description has been made on wavelength correction in an arrayed waveguide diffraction grating. However, similar problems arise in wavelength correction in other optical elements and a wavelength check to be done to check whether the wavelength of an optical element of a product at the time of shipment complies with a required specification.

SUMMARY OF THE INVENTION

The present invention has been made in consideration of the above situation in the prior art, and has as its object to provide a wavelength correction method and apparatus and a wavelength check method and apparatus, which can quickly and easily correct and check the wavelength of an optical element having a waveguide such as an arrayed waveguide diffraction grating, an arrayed waveguide diffraction grating which is to be corrected or has been corrected, and an interleaver.

In order to achieve the above object, according to the first aspect of the present invention, there is provided a wavelength correction method in a slab waveguide formed as one waveguide as a whole by combining two waveguide components with a predetermined end face which is so formed on one waveguide component as to cross an optical axis being placed to oppose an end face which is so formed on the other waveguide component so as to be parallel with the predetermined end face, or a slab waveguide assembly formed by connecting another waveguide to the slab waveguide, comprising the first-wavelength-based measurement step of causing a light component having a first wavelength $\lambda 1$ shifted from a target center wavelength $\lambda g$ by a predetermined wavelength to be incident from the waveguide component placed on, an incident side, and at the same time, measuring a level of a light component output at each movement position while moving at least one of the two waveguide components in a direction crossing the optical axis, the second-wavelength-based measurement step of causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the two waveguide components at each movement position while moving at least one of the two waveguide components in the direction crossing the optical axis, the coincident position discrimination step of discriminating a relative movement position of the two waveguide components at which the level of the light component obtained in the first-wavelength-based measurement step coincides with the level of the light component obtained in the second-wavelength-based measurement step, and the final correction step of fixing a positional relationship between the two waveguide components in the direction crossing the optical axis to the relative movement position discriminated in the coincident position discrimination step in order to complete correction for the center wavelength $\lambda g$.

According to the first aspect, in a slab waveguide formed as one waveguide as a whole by combining two waveguide components with a predetermined end face which is so formed on one waveguide component as to cross an optical axis being placed to oppose an end face which is so formed on the other waveguide component so as to be parallel with the predetermined end face, or a slab waveguide assembly formed by connecting another waveguide to the slab waveguide, light having the first wavelength $\lambda 1$ shifted from the center wavelength $\lambda g$ as the correction target by the predetermined wavelength is incident on the waveguide component on the incident side. In this state, the level of output light is measured while the relative position of the two waveguide components is changed. Likewise, light having the second wavelength $\lambda 2$ on the opposite side of the wavelength $\lambda g$ as a middle point to the first wavelength $\lambda 1$ is output, and similar measurement is performed. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

If a waveform having the wavelength $\lambda g$ as a peak has a symmetrical shape on the short wavelength side and long wavelength side with the wavelength $\lambda g$ as the center, the level measured at the first wavelength $\lambda 1$ should coincide with that measured at the second wavelength $\lambda 2$. In the coincident position discrimination step, a relative movement position is discriminated, at which the level of light obtained in the first-wavelength-based measurement step coincides with the level of light obtained in the second-wavelength-based measurement step, and the positional relationship between the two waveguide components in the direction crossing the optical axis is fixed to the discriminated relative movement position, thereby terminating correction for the center wavelength $\lambda g$.

In order to achieve the above object, according to the second aspect of the present invention, there is provided a wavelength correction method in a slab waveguide formed as one waveguide as a whole by combining two waveguide components with a predetermined end face which is so formed on one waveguide component as to cross an optical axis being placed to oppose an end face which is so formed on the other waveguide component so as to be parallel with the predetermined end face, or a slab waveguide assembly formed by connecting another waveguide to the slab waveguide, comprising the wavelength time-divisional measurement step of causing a light component having a first wavelength $\lambda 1$ shifted from a target center wavelength $\lambda g$ by a predetermined wavelength and a light component having a second wavelength $\lambda 2$ symmetrical to the first wavelength to be alternately and periodically incident from the wavelength component placed on an incident side, and at the same time, measuring levels of light components output via the two waveguide components at each movement position while moving at least one of the two waveguide components in a direction crossing the optical axis, the level comparison step of comparing the levels of the two light components output through the two waveguide components, which are measured in the wavelength time-divisional measurement step, based on the wavelengths $\lambda 1$ and $\lambda 2$, and the final correction step of fixing a positional relationship between the waveguide component placed on the incident side and the waveguide component placed on an exit side to a position where the levels of the two light components coincide with each other in the level comparison step in order to complete correction for the center wavelength $\lambda g$.

According to the second aspect, in a slab waveguide formed as one waveguide as a whole by combining two waveguide components with a predetermined end face which is so formed on one waveguide component as to cross an optical axis being placed to oppose an end face which is so formed on the other waveguide component so as to be parallel with the predetermined end face, or a slab waveguide assembly formed by connecting another waveguide to the slab waveguide, light components having the first and second wavelengths $\lambda 1$ and $\lambda 2$ are alternately and repeatedly output with the center wavelength $\lambda g$ as the correction target being a middle point, and an output level at each position in this relationship is measured. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

If a waveform having the wavelength $\lambda g$ as a peak has a symmetrical shape on the short wavelength side and long wavelength side with the wavelength $\lambda g$ as the center, the level measured at the first wavelength $\lambda 1$ should coincide with that measured at the second wavelength $\lambda 2$. In the coincident position discrimination step, a relative movement position is discriminated, at which the level of light obtained in the first-wavelength-based measurement step coincides with the level of light obtained in the second-wavelength-based measurement step, and the positional relationship between the two waveguide components in the direction crossing the optical axis is fixed to the discriminated relative movement position, thereby terminating correction for the center wavelength $\lambda g$.

According to the third aspect of the present invention, in the wavelength correction method according to the first or second aspect, the interval between the first and second wavelengths $\lambda 1$ and $\lambda 2$ is a full-width at half-maximum of a spectrum, and a middle point between the wavelengths coincides with the wavelength $\lambda g$.

The first and second wavelengths $\lambda 1$ and $\lambda 2$ may have values other than those described above. However, if the interval between the two wavelengths is set to the full-width at half-maximum of the spectrum, correction can be made at a position conforming to the definition of a center wavelength.

According to the fourth aspect of the present invention, in the wavelength correction method according to the first aspect, another slab waveguide is connected to an output side of the slab waveguide via a channel waveguide array, and in the final correction step, measurement is done to obtain a relative positional relationship between the slab waveguide and the another slab waveguide connected to the output side of the slab waveguide on the basis of levels of light components output from the two slab waveguides, and the positional relationship between the two slab waveguides is fixed on the basis of the measurement result in order to terminate correction for the center wavelength $\lambda g$.

According to the fourth aspect, therefore, the center wavelength $\lambda g$ can be accurately corrected by, for example, averaging the correction results obtained on the respective output waveguides arranged on the output side of the channel waveguide array.

In order to achieve the above object, according to the fifth aspect of the present invention, there is provided a wavelength correction apparatus in a slab waveguide formed as one waveguide as a whole by combining two waveguide components with a predetermined end face which is so formed on one waveguide component as to cross an optical axis being placed to oppose an end face which is so formed on the other waveguide component so as to be parallel with the predetermined end face, or a slab waveguide assembly formed by connecting another waveguide to the slab waveguide, comprising first-wavelength-based measurement means for causing a light component having a first wavelength $\lambda 1$ shifted from a target center wavelength $\lambda g$ by a predetermined wavelength to be incident from the waveguide component placed on an incident side, and at the same time, measuring a level of a light component output at each movement position while moving at least one of the two waveguide components in a direction crossing the optical axis, second-wavelength-based measurement means for causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the two waveguide components at each movement position while moving at least one of the two waveguide components in the direction crossing the optical axis, coincident position discrimination means for discriminating a relative movement position of the two waveguide components at which the level of the light component obtained by the first-wavelength-based measurement means coincides with the level of the light component obtained by the second-wavelength-based measurement means, and final correction means for fixing a positional relationship between the two waveguide components in the direction crossing the optical axis to the relative movement position discriminated in the coincident position discrimination step in order to complete correction for the center wavelength $\lambda g$.

According to the fifth aspect, in a slab waveguide formed as one waveguide as a whole by combining two waveguide components with a predetermined end face which is so formed on one waveguide component as to cross an optical axis being placed to oppose an end face which is so formed on the other waveguide component so as to be parallel with the predetermined end face, or a slab waveguide assembly formed by connecting another waveguide to the slab waveguide, light having the first wavelength $\lambda 1$ shifted from the center wavelength $\lambda g$ as the correction target by the predetermined wavelength is incident on the waveguide component on the incident side. In this state, the level of output light is measured at each position while the relative position of the two waveguide components is changed. In addition, light having the second wavelength $\lambda 2$ on the opposite side of the wavelength $\lambda g$ as a middle point to the first wavelength $\lambda 1$ is output, and similar measurement is performed. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

If a waveform having the wavelength $\lambda g$ as a peak has a symmetrical shape on the short wavelength side and long wavelength side with the wavelength $\lambda g$ as the center, the level measured at the first wavelength $\lambda 1$ should coincide with that measured at the second wavelength $\lambda 2$. In the coincident position discrimination step, a relative movement position is discriminated, at which the level of light obtained in the first-wavelength-based measurement step coincides with the level of light obtained in the second-wavelength-based measurement step, and the positional relationship between the two waveguide components in the direction crossing the optical axis is fixed to the discriminated relative movement position, thereby terminating correction for the center wavelength $\lambda g$.

In order to achieve the above object, according to the sixth aspect of the present invention, there is provided a wavelength correction apparatus in a slab waveguide formed as one waveguide as a whole by combining two waveguide components with a predetermined end face which is so formed on one waveguide component as to cross an optical axis being placed to oppose an end face which is so formed on the other waveguide component so as to be parallel with the predetermined end face, or a slab waveguide assembly formed by connecting another waveguide to the slab waveguide, comprising wavelength time-divisional measurement means for causing a light component having a first wavelength $\lambda 1$ shifted from a target center wavelength $\lambda g$ by a predetermined wavelength and a light component having a second wavelength $\lambda 2$ symmetrical to the first wavelength to be alternately and periodically incident from the wavelength component placed on an incident side, and at the same time, measuring levels of light components output via the two waveguide components at each movement position while moving at least one of the two waveguide components in a direction crossing the optical axis, level comparison, means for comparing the levels of the two light components output through the two waveguide components, which are measured by the wavelength time-divisional measurement means, based on the wavelengths λ1 and λ2, and final correction means for fixing a positional relationship between the waveguide component placed on the incident side and the waveguide component placed on an exit side to a position where the levels of the two light components coincide with each other by the level comparison means in order to complete correction for the center wavelength λg.

According to the sixth aspect, in a slab waveguide formed as one waveguide as a whole by combining two waveguide components with a predetermined end face which is so formed on one waveguide component as to cross an optical axis being placed to oppose an end face which is so formed on the other waveguide component so as to be parallel with the predetermined end face, or a slab waveguide assembly formed by connecting another waveguide to the slab waveguide, light components having the first and second wavelengths λ1 and λ2 are alternately and repeatedly output with the center wavelength λg as the correction target being a middle point, and output levels at the respective positions of the two waveguide components are measured on the basis of this relationship. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

If a waveform having the wavelength λg as a peak has a symmetrical shape on the short wavelength side and long wavelength side with the wavelength λg as the center, the level measured at the first wavelength λ1 should coincide with that measured at the second wavelength λ2. In the coincident position discrimination step, a relative movement position is discriminated, at which the level of light obtained in the first-wavelength-based measurement step coincides with the level of light obtained in the second-wavelength-based measurement step, and the positional relationship between the two waveguide components in the direction crossing the optical axis is fixed to the discriminated relative movement position, thereby terminating correction for the center wavelength λg.

According to the seventh aspect of the present invention, in the wavelength correction apparatus according to the fifth or sixth aspect, the interval between the first and second wavelengths λ1 and λ2 is a full-width at half-maximum of a spectrum, and a middle point between the wavelengths coincides with the wavelength λg.

In the seventh aspect, the first and second wavelengths λ1 and λ2 may have values other than those described above. However, if the interval between the two wavelengths is set to the full-width at half-maximum of the spectrum, correction can be made at a position conforming to the definition of a center wavelength.

According to the eighth aspect of the present invention, in the wavelength correction apparatus according to the fifth aspect, another slab waveguide is connected to an output side of the slab waveguide via a channel waveguide array, and in the final correction means, measurement is done to obtain a relative positional relationship between the slab waveguide and the another slab waveguide connected to the output side of the slab waveguide on the basis of levels of light components output from the two slab waveguides, and the positional relationship between the two slab waveguides is fixed on the basis of the measurement result to terminate correction for the center wavelength λg.

According to the eighth aspect, therefore, the center wavelength λg can be accurately corrected by, for example, averaging the correction results obtained on the respective output waveguides arranged on the output side of the channel waveguide array.

In order to achieve the above object, according to the ninth aspect of the present invention, there is provided a wavelength correction method comprising the first wavelength incidence time power detection step of, when a light component having a first wavelength λ1 shifted from a specific wavelength by a predetermined wavelength is incident on a specific waveguide which can change a wavelength characteristic, detecting an intensity of light emerging from the specific waveguide, the second waveguide incidence time power detection step of when a light component having a second wavelength λ2 symmetrical to the first wavelength λ1 with respect to the specific wavelength is incident, detecting an intensity of light emerging from the specific waveguide, and the characteristic changing step of changing a characteristic of the specific waveguide such that the intensities of light detected in the first and second wavelength incidence time detection steps coincide with each other.

In the ninth aspect, it is assumed that the waveform having the specific wavelength as a peak has a symmetrical shape on the short wavelength side and long wavelength side with the specific wavelength as the center. The characteristics of a specific waveguide is changed such that the intensity of light emerging from this specific waveguide when light having the first wavelength λ1 shifted from the specific wavelength by a predetermined wavelength is incident on the specific waveguide coincides with the intensity of light emerging from the specific waveguide when light having the second wavelength λ2 symmetrical to the first wavelength λ1 with respect to the specific wavelength as the center is incident. This makes it possible to properly correct the wavelength characteristics of the specific waveguide.

According to the 10th aspect of the present invention, in the wavelength correction method according to the ninth aspect, in the characteristic changing step, the characteristic is changed by heating the specific waveguide.

In the 10th aspect, the wavelength characteristics of the specific waveguide are changed by heating. For example, a resistive element is placed in a waveguide and energized to apply a heat pulse to the waveguide, thereby changing the characteristics.

According to the 11th aspect of the present invention, in the wavelength correction method according to the ninth aspect, in the characteristic changing step, the characteristic is changed by heating the specific waveguide.

In the 11th aspect, the wavelength characteristics of the specific waveguide are changed by irradiation of ultraviolet light.

In order to achieve the above object, according to the 12th aspect of the present invention, there is provided a wavelength correction apparatus comprising light incidence means for selectively causing light having a first wavelength λ1 shifted from a specific wavelength by a predetermined wavelength and a light component having a wavelength λ2 which is symmetrical to the first wavelength λ1 with respect to the specific wavelength to be incident on a specific waveguide which can change a wavelength characteristic, first wavelength incidence time power detection means for, when the light component having the first wavelength λ1 is made incident by the light incidence means, detecting an intensity of light emerging from the specific waveguide, second wavelength incidence time power detection means for, when the light component having the second wavelength λ2 is made incident by the light incidence means, detecting an intensity of light emerging from the specific waveguide, and characteristic changing means for changing a characteristic of the specific waveguide such that the intensities of light detected by the first and second wavelength incidence time power detection means coincide with each other.

In the 12th aspect, it is assumed that the waveform having the specific wavelength as a peak has a symmetrical shape on the short wavelength side and long wavelength side with the specific wavelength as the center. The characteristics of a specific waveguide is changed such that the intensity of light emerging from this specific waveguide when light having the first wavelength λ1 shifted from the specific wavelength by a predetermined wavelength is incident on the specific waveguide coincides with the intensity of light emerging from the specific waveguide when light having the second wavelength λ2 symmetrical to the first wavelength λ1 with respect to the specific wavelength as the center is incident. This makes it possible to properly correct the wavelength characteristics of the specific waveguide.

According to the 13th aspect of the present invention, in the wavelength correction apparatus according to the 12th aspect, the characteristic changing means changes the characteristic by heating the specific waveguide.

In the 13th aspect, the wavelength characteristics of the specific waveguide are changed by heating. For example, a resistive element is placed in a waveguide and energized to apply a heat pulse to the waveguide so as to change the characteristics.

According to the 14th aspect of the present invention, in the wavelength correction apparatus according to the 12th aspect, the characteristic changing means changes the characteristic by irradiating the specific waveguide with ultraviolet light.

In the 14th aspect, the wavelength characteristics of the specific waveguide are changed by irradiation of ultraviolet light.

In order to achieve the above object, according to the 15th aspect of the present invention, there is provided a wavelength check method comprising the first wavelength incidence time power detection step of, when light having a first wavelength λ1 shifted from a specific wavelength by a predetermined wavelength is incident on a specific waveguide, detecting an intensity of light emerging from the specific waveguide, the second wavelength incidence time power detection step of, when light having a second wavelength λ2 symmetrical to the first wavelength λ1 with respect to the specific wavelength is incident on the specific waveguide, detecting an intensity of light emerging from the specific waveguide, the comparison step of comparing the intensities of light detected in the first and second wavelength incidence time power detection steps, and the discrimination step of discriminating on the basis of the comparison result in the comparison step whether the specific wavelength coincides with a peak of light intensity in the specific waveguide.

According to the 15th aspect, if the light output from a specific waveguide exhibits a peak at a specific wavelength, the power of light is attenuated when the wavelength is shifted from the specific wavelength either to the short wavelength side or to the long wavelength side. Light components having the first and second wavelengths λ1 and λ2 located on the two sides of the specific wavelength are incident on the specific waveguide, and the intensities of light components emerging therefrom are compared with each other. It is then discriminated whether, for example, the comparison result falls within an allowable range. This makes it possible to discriminate the quality of the waveguide.

In order to achieve the above object, according to the 16th aspect of the present invention, there is provided a wavelength check apparatus comprising light incidence means for selectively causing light having a first wavelength λ1 shifted from a specific wavelength by a predetermined wavelength and light having a second wavelength λ2 symmetrical to the first wavelength λ1 with respect to the specific wavelength to be incident on a specific waveguide, first wavelength incidence time power detection means for, when the light component having the first wavelength λ1 is made incident by the light incidence means, detecting an intensity of light emerging from the specific waveguide, second wavelength incidence time power detection means for, when the light component having the second wavelength λ2 is made incident by the light incidence means, detecting an intensity of light emerging from the specific waveguide, comparison means for detecting the intensities of light detected by the first and second wavelength incidence time power detection means, and discrimination means for discriminating on the basis of the comparison result obtained by the comparison means whether the specific wavelength coincides with a peak of light intensity in the specific waveguide.

According to the 16th aspect, if the light output from a specific waveguide exhibits a peak at a specific wavelength, the power of light is attenuated when the wavelength is shifted from the specific wavelength either to the short wavelength side or to the long wavelength side. Light components having the first and second wavelengths λ1 and λ2 located on the two sides of the specific wavelength are incident on the specific waveguide, and the intensities of light components emerging therefrom are compared with each other. It is then discriminated whether, for example, the comparison result falls within an allowable range. This makes it possible to discriminate the quality of the waveguide.

In order to achieve the above object, according to the 17th aspect of the present invention, there is provided a wavelength correction method in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising the center wavelength measurement step of causing light having a predetermined wavelength width to be incident from a waveguide component placed on an incident side, and measuring a center wavelength λ0 of light which has passed through a predetermined optical part connected to a waveguide component placed on an exit side, the firstwavelength-based measurement step of causing a light component having a first wavelength $\lambda 1$ shifted from a target center wavelength $\lambda g$ by a predetermined wavelength to be incident from the waveguide component placed on the incident side, and at the same time, measuring a level of a light component output at each movement position while moving at least one of the two waveguide components in a direction crossing the optical axis, the second-wavelength-based measurement step of causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the two waveguide components at each movement position while moving at least one of the two waveguide components in the direction crossing the optical axis, the coincident position discrimination step of discriminating a relative movement position of the two waveguide components at which the level of the light component obtained in the first-wavelength-based measurement step coincides with the level of the light component obtained in the second-wavelength-based measurement step, and the final correction step of fixing a positional relationship between the two waveguide components in the direction crossing the optical axis to the relative movement position discriminated in the coincident position discrimination step in order to complete correction for the center wavelength $\lambda g$.

According to the 17th aspect, in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, the center wavelength $\lambda 0$ of light output from this structure is measured. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

According to the 17th aspect, since the center wavelength changes as the relative positional relationship between the two waveguide components changes, light having the first wavelength $\lambda 1$ shifted from the center wavelength $\lambda g$ as the correction target by a predetermined wavelength is incident on the waveguide component located on the incident side, and the level of light output at each position is measured while the relative position of the two waveguide components is changed in this state. Likewise, light having the second wavelength $\lambda 2$ on the opposite side of the wavelength $\lambda g$ as a middle point to the first wavelength $\lambda 1$ is output, and similar measurement is performed. If a waveform having the wavelength $\lambda g$ as a peak has a symmetrical shape on the short wavelength side and long wavelength side with the wavelength $\lambda g$ as the center, the level measured at the first wavelength $\lambda 1$ should coincide with that measured at the second wavelength $\lambda 2$. In the coincident position discrimination step, a relative movement position is discriminated, at which the level of light obtained in the first-wavelength-based measurement step coincides with the level of light obtained in the second-wavelength-based measurement step, and the positional relationship between the two waveguide components in the direction crossing the optical axis is fixed to the discriminated relative movement position, thereby terminating correction for the center wavelength $\lambda g$.

In order to achieve the above object, according to the 18th aspect of the present invention, there is provided a wavelength correction method in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising the center wavelength measurement step of causing light having a predetermined wavelength width to be incident from a waveguide component placed on an incident side, and measuring a center wavelength $\lambda 0$ of light which has passed through a predetermined optical part connected to a waveguide component placed on an exit side, the temporary correction step of obtaining a difference between the center wavelength $\lambda 0$ obtained by measurement in the center wavelength measurement step and a target center wavelength $\lambda g$, and temporarily moving at least one of the two waveguide components to a relative position where the center wavelength $\lambda g$ is to be obtained in a direction crossing the optical axis on the basis of the obtained difference, the first-wavelength-based measurement step of causing a light component having a first wavelength $\lambda 1$ shifted from the center wavelength $\lambda g$ by a predetermined wavelength to be incident from the waveguide component placed on the incident side, and at the same time, measuring a level of a light component output at each movement position while moving at least one of the two waveguide components, relative to the position to which the waveguide component has been moved in the temporary correction step, in a direction crossing the optical axis, the second-wavelength-based measurement step of causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the two waveguide components at each movement position while moving at least one of the two waveguide components, relative to the position to which the waveguide component has been moved in the temporary correction step, in the direction crossing the optical axis, the coincident position discrimination step of discriminating a relative movement position of the two waveguide components at which the level of the light component obtained in the first-wavelength-based measurement step coincides with the level of the light component obtained in the second-wavelength-based measurement step, and the final correction step of fixing a positional relationship between the two waveguide components in the direction crossing the optical axis to the relative movement position discriminated in the coincident position discrimination step in order to complete correction for the center wavelength $\lambda g$.

According to the 18th aspect, in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, the center wavelength $\lambda 0$ of light output from this structure is measured. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

In the temporary correction step, the difference between the center wavelength $\lambda 0$ obtained by measurement in the center wavelength measurement step and the center wavelength $\lambda g$ as the correction target is obtained, and at least one of the two waveguide components is temporarily moved, in accordance with the obtained difference, in the direction crossing the optical axis up to the relative position where the center wavelength $\lambda g$ should be obtained. By this movement, the center wavelength is brought near to the wavelength $\lambda g$, although it has a slight error, thereby terminating temporary correction as coarse correction. Thereafter, fine correction concerning position is executed. In this correction, with reference to the position determined by temporary correction, light having the first wavelength $\lambda 1$ shifted from the center wavelength $\lambda g$ as the correction target by a predetermined wavelength is incident on the waveguide component located on the incident side, and the level of output light is measured while the relative position of the two waveguide components is changed in this state. In addition, light having the second wavelength $\lambda 2$ on the opposite side of the wavelength $\lambda g$ as a middle point to the first wavelength $\lambda 1$ is output, and similar measurement is performed. If a waveform having the wavelength $\lambda g$ as a peak has a symmetrical shape on the short wavelength side and long wavelength side with the wavelength $\lambda g$ as the center, the level measured at the first wavelength $\lambda 1$ should coincide with that measured at the second wavelength $\lambda 2$. In the coincident position discrimination step, a relative movement position is discriminated, at which the level of light obtained in the first-wavelength-based measurement step coincides with the level of light obtained in the second-wavelength-based measurement step, and the positional relationship between the two waveguide components in the direction crossing the optical axis is fixed to the discriminated relative movement position, thereby terminating correction for the center wavelength $\lambda g$.

In the 18th aspect, since a relative position near the wavelength $\lambda g$ is found out in the temporary correction step, the minimum range of position movement (scanning) in measurement based on the first and second wavelengths $\lambda 1$ and $\lambda 2$ can be discriminated accurately to some extent. This eliminates unnecessary scanning operation.

In order to achieve the above object, according to the 19th aspect of the present invention, there is provided a wavelength correction method in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising the center wavelength measurement step of causing light in a relatively wide band to be incident from a waveguide component placed on an incident side, and measuring a center wavelength $\lambda 0$ of light output via a channel waveguide array connected to an opposite side of a slab waveguide to the input-side waveguide, the temporary correction step of obtaining a difference between the center wavelength $\lambda 0$ obtained by measurement in the center wavelength measurement step and a target center wavelength $\lambda g$, and temporarily moving at least one of the two waveguide components to a relative position where the center wavelength $\lambda g$ is to be obtained in a direction crossing the optical axis on the basis of the obtained difference, the first-wavelength-based measurement step of causing a light component having a first wavelength $\lambda 1$ shifted from the center wavelength $\lambda g$ by a predetermined wavelength to be incident from the waveguide component placed on the incident side, and at the same time, measuring a level of a light component output via the channel waveguide array at each movement position while moving at least one of the two waveguide components, relative to the position to which the waveguide component has been moved in the temporary correction step, in a direction crossing the optical axis, the second-wavelength-based measurement step of causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the channel waveguide array at each movement position while moving at least one of the two waveguide components, relative to the position to which the waveguide component has been moved in the temporary correction step, in the direction crossing the optical axis, the coincident position discrimination step of discriminating a relative movement position of the two waveguide components at which the level of the light component obtained in the first-wavelength-based measurement step coincides with the level of the light component obtained in the second-wavelength-based measurement step, and the final correction step of fixing a positional relationship between the two waveguide components in the direction crossing the optical axis to the relative movement position discriminated in the coincident position discrimination step in order to complete correction for the center wavelength $\lambda g$.

According to the 19th aspect, in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, the center wavelength $\lambda 0$ of light output from this structure is measured. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

In the temporary correction step, the difference between the center wavelength $\lambda 0$ obtained by measurement in the center wavelength measurement step and the center wavelength $\lambda g$ as the correction target is obtained, and at least one of the two waveguide components is temporarily moved, in accordance with the obtained difference, in the direction crossing the optical axis up to the relative position where the center wavelength $\lambda g$ should be obtained. By this movement, the center wavelength is brought near to the wavelength $\lambda g$, although it has a slight error, thereby terminating temporary correction as coarse correction. Thereafter, fine correction concerning position is executed. In this correction, with reference to the position determined by temporary correction, light having the first wavelength $\lambda 1$ shifted from the center wavelength $\lambda g$ as the correction target by a predetermined wavelength is incident on the waveguide component located on the incident side, and the level of light output via the channel waveguide array is measured while the relative position of the two waveguide components is changed in this state. In addition, light having the second wavelength $\lambda 2$ on the opposite side of the wavelength $\lambda g$ as a middle point to the first wavelength $\lambda 1$ is output, and similar measurement is performed. If a waveform having the wavelength $\lambda g$ as a peak has a symmetrical shape on the short wavelength side and long wavelength side with the wavelength $\lambda g$ as the center, the level measured at the first wavelength $\lambda 1$ should coincide with that measured at the second wavelength $\lambda 2$. In the coincident position discrimination step, a relative movement position is discriminated, at which the level of light obtained in the first-wavelength-based measurement step coincides with the level of light obtained in the second-wavelength-based measurement step, and the positional relationship between the two waveguide components in the direction crossing the optical axis is fixed to the discriminated relative movement position, thereby terminating correction for the center wavelength $\lambda g$.

In the 19th aspect, since a relative position near the wavelength $\lambda g$ is found out in the temporary correction step, the minimum range of position movement (scanning) in measurement based on the first and second wavelengths $\lambda 1$ and $\lambda 2$ can be discriminated accurately to some extent. This eliminates unnecessary scanning operation. In addition, the slab waveguide is implemented as an arrayed waveguide diffraction grating or the like connected to a channel waveguide array as an optical part.

In order to achieve the above object, according to the 20th aspect of the present invention, there is provided a wavelength correction method in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising the center wavelength measurement step of causing light having a predetermined wavelength width to be incident from a waveguide component placed on an incident side, and measuring a center wavelength $\lambda 0$ of light which has passed through a predetermined optical part connected to a waveguide component placed on an exit side, the wavelength time-divisional measurement step of causing a light component having a first wavelength $\lambda 1$ and a light component having a second wavelength $\lambda 2$ which are symmetrical with respect to a target center wavelength $\lambda g$ to be alternately and periodically incident from the wavelength component placed on an incident side, and at the same time, measuring levels of light components output via the two waveguide components at each movement position while moving at least one of the two waveguide components in a direction crossing the optical axis, the level comparison step of comparing the levels of the two light components output through the optical part, which are measured in the wavelength time-divisional measurement step, based on the wavelengths $\lambda 1$ and $\lambda 2$, and the final correction step of fixing a positional relationship between the waveguide component placed on the incident side and the waveguide component placed on an exit side to a position where the levels of the two light components coincide with each other in the level comparison step in order to complete correction for the center wavelength $\lambda g$.

According to the 20th aspect, in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, the center wavelength $\lambda 0$ of light output from this structure is measured. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

In the 20th aspect, since the center wavelength changes as the relative positional relationship between the two waveguide components changes, light components having the first and second wavelengths $\lambda 1$ and $\lambda 2$ are alternately and repeatedly output with the center wavelength $\lambda g$ as the correction target being a middle point, and an output level at each position in this relationship is measured. If a waveform having the wavelength $\lambda g$ as a peak has a symmetrical shape on the short wavelength side and long wavelength side with the wavelength $\lambda g$ as the center, the level measured at the first wavelength $\lambda 1$ should coincide with that measured at the second wavelength $\lambda 2$. In the coincident position discrimination step, a relative movement position is discriminated, at which the level of light obtained in the first-wavelength-based measurement step coincides with the level of light obtained in the second-wavelength-based measurement step, and the positional relationship between the two waveguide components in the direction crossing the optical axis is fixed to the discriminated relative movement position, thereby terminating correction for the center wavelength $\lambda g$.

According to the 21st aspect of the present invention, in the wavelength correction method according to any one of the 17th to 20th aspects, the interval between the first and second wavelengths λ1 and λ2 is a full-width at half-maximum of a spectrum, and a middle point between the wavelengths coincides with the wavelength λg.

The first and second wavelengths λ1 and λ2 may have values other than those described above. However, if the interval between the two wavelengths is set to the full-width at half-maximum of the spectrum, correction can be made at a position conforming to the definition of a center wavelength.

According to the 22nd aspect of the present invention, in the wavelength correction method according to the 19th aspect, a plurality of output waveguides are connected to an output side of the channel waveguide array via another slab waveguide, and in the final correction step, measurement is done to obtain a relative positional relationship between the slab waveguide and the another slab waveguide connected to the output side of the slab waveguide on the basis of levels of light components output from the two slab waveguides, and the positional relationship between the two slab waveguides is fixed on the basis of the measurement result in order to terminate correction for the center wavelength λg.

According to the 22nd aspect, therefore, the center wavelength λg can be accurately corrected by, for example, averaging the correction results obtained on the respective output waveguides arranged on the output side of the channel waveguide array.

In order to achieve the above object, according to the 23rd aspect of the present invention, there is provided a wavelength correction apparatus in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising center wavelength measurement means for causing light having a predetermined wavelength width to be incident from a waveguide component placed on an incident side, and measuring a center wavelength λ0 of light which has passed through a predetermined optical part connected to a waveguide component placed on an exit side, first-wavelength-based measurement means for causing a light component having a first wavelength λ1 shifted from a target center wavelength λg by a predetermined wavelength to be incident from the waveguide component placed on the incident side, and at the same time, measuring a level of a light component output at each movement position while moving at least one of the two waveguide components in a direction crossing the optical axis, second-wavelength-based measurement means for causing a light component having a second wavelength λ2 symmetrical to the first wavelength λ1 with respect to the center wavelength λg to be incident from the waveguide component placed on the incident side, and at the same time, measuring a level of a light component output via the two waveguide components at each movement position while moving at least one of the two waveguide components in the direction crossing the optical axis, coincident position discrimination means for discriminating a relative movement position of the two waveguide components at which the level of the light component obtained by the first-wavelength-based measurement means coincides with the level of the light component obtained by the second-wavelength-based measurement means, and final correction means for fixing a positional relationship between the two waveguide components in the direction crossing the optical axis to the relative movement position discriminated by the coincident position discrimination means in order to complete correction for the center wavelength λg.

According to the 23rd aspect, in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, the center wavelength λ0 of light output from this structure is measured. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

According to the 23rd aspect, since the center wavelength changes as the relative positional relationship between the two waveguide components changes, light having the first wavelength λ1 shifted from the center wavelength λg as the correction target by a predetermined wavelength is incident on the waveguide component located on the incident side, and the level of light output at each position is measured while the relative position of the two waveguide components is changed in this state. Likewise, light having the second wavelength λ2 on the opposite side of the wavelength λg as a middle point to the first wavelength λ1 is output, and similar measurement is performed. If a waveform having the wavelength λg as a peak has a symmetrical shape on the short wavelength side and long wavelength side with the wavelength λg as the center, the level measured at the first wavelength λ1 should coincide with that measured at the second wavelength λ2. The coincident position discrimination means discriminates a relative movement position at which the level of light obtained by the first-wavelength-based measurement means coincides with the level of light obtained by the second-wavelength-based measurement means, and the positional relationship between the two waveguide components in the direction crossing the optical axis is fixed to the discriminated relative movement position, thereby terminating correction for the center wavelength λg.

In order to achieve the above object, according to the 24th aspect of the present invention, there is provided a wavelength correction apparatus in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising center wavelength measurement means for causing light having a predetermined wavelength width to be incident from a waveguide component placed on an incident side, and measuring a center wavelength $\lambda 0$ of light which has passed through a predetermined optical part connected to a waveguide component placed on an exit side, temporary correction means for obtaining a difference between the center wavelength $\lambda 0$ obtained by measurement by the center wavelength measurement means and a target center wavelength $\lambda g$, and temporarily moving at least one of the two waveguide components to a relative position where the center wavelength $\lambda g$ is to be obtained in a direction crossing the optical axis on the basis of the obtained difference, first-wavelength-based measurement means for causing a light component having a first wavelength $\lambda 1$ shifted from the center wavelength $\lambda g$ by a predetermined wavelength to be incident from the waveguide component placed on the incident side, and at the same time, measuring a level of a light component output at each movement position while moving at least one of the two waveguide components, relative to the position to which the waveguide component has been moved by the temporary correction means, in a direction crossing the optical axis, second-wavelength-based measurement means for causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the two waveguide components at each movement position while moving at least one of the two waveguide components, relative to the position to which the waveguide component has been moved by the temporary correction means, in the direction crossing the optical axis, coincident position discrimination means for discriminating a relative movement position of the two waveguide components at which the level of the light component obtained by the first-wavelength-based measurement means coincides with the level of the light component obtained by the second-wavelength-based measurement means, and final correction means for fixing a positional relationship between the two waveguide components in the direction crossing the optical axis to the relative movement position discriminated by the coincident position discrimination means in order to complete correction for the center wavelength $\lambda g$.

According to the 24th aspect, in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, the center wavelength $\lambda 0$ of light output from this structure is measured. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

The temporary correction means obtains the difference between the center wavelength $\lambda 0$ obtained by measurement in the center wavelength measurement step and the center wavelength $\lambda g$ as the correction target, and at least one of the two waveguide components is temporarily moved, in accordance with the obtained difference, in the direction crossing the optical axis up to the relative position where the center wavelength $\lambda g$ should be obtained. By this movement, the center wavelength is brought near to the wavelength $\lambda g$, although it has a slight error, thereby terminating temporary correction as coarse correction. Thereafter, fine correction concerning position is executed. In this correction, with reference to the position determined by temporary correction, light having the first wavelength $\lambda 1$ shifted from the center wavelength $\lambda g$ as the correction target by a predetermined wavelength is incident on the waveguide component located on the incident side, and the level of output light is measured while the relative position of the two waveguide components is changed in this state. In addition, light having the second wavelength $\lambda 2$ on the opposite side of the wavelength $\lambda g$ as a middle point to the first wavelength $\lambda 1$ is output, and similar measurement is performed. If a waveform having the wavelength $\lambda g$ as a peak has a symmetrical shape on the short wavelength side and long wavelength side with the wavelength $\lambda g$ as the center, the level measured at the first wavelength $\lambda 1$ should coincide with that measured at the second wavelength $\lambda 2$. The coincident position discrimination means discriminates a relative movement position at which the level of light obtained by the first-wavelength-based measurement means coincides with the level of light obtained by the second-wavelength-based measurement means, and the positional relationship between the two waveguide components in the direction crossing the optical axis is fixed to the discriminated relative movement position, thereby terminating correction for the center wavelength $\lambda g$.

In the 24th aspect, since a relative position near the wavelength $\lambda g$ is found out by the temporary correction means, the minimum range of position movement (scanning) in measurement based on the first and second wavelengths $\lambda 1$ and $\lambda 2$ can be discriminated accurately to some extent. This eliminates unnecessary scanning operation.

In order to achieve the above object, according to the 25th aspect of the present invention, there is provided a wavelength correction apparatus in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising center wavelength measurement means for causing light in a relatively wide band to be incident from a waveguide component placed on an incident side, and measuring a center wavelength $\lambda 0$ of light output via a channel waveguide array connected to an opposite side of a slab waveguide to the input-side waveguide, temporary correction means for obtaining a difference between the center wavelength $\lambda 0$ obtained by measurement by the center wavelength measurement means and a target center wavelength λg, and temporarily moving at least one of the two waveguide components to a relative position where the center wavelength λg is to be obtained in a direction crossing the optical axis on the basis of the obtained difference, first-wavelength-based measurement means for causing a light component having a first wavelength λ1 shifted from the center wavelength λg by a predetermined wavelength to be incident from the waveguide component placed on the incident side, and at the same time, measuring a level of a light component output via the channel waveguide array at each movement position while moving at least one of the two waveguide components, relative to the position to which the waveguide component has been moved by the temporary correction means, in a direction crossing the optical axis, second-wavelength-based measurement means for causing a light component having a second wavelength λ2 symmetrical to the first wavelength λ1 with respect to the center wavelength λg to be incident from the waveguide component placed on the incident side, and at the same time, measuring a level of a light component output via the channel waveguide array at each movement position while moving at least one of the two waveguide components, relative to the position to which the waveguide component has been moved by the temporary correction means, in the direction crossing the optical axis, coincident position discrimination means for discriminating a relative movement position of the two waveguide components at which the level of the light component obtained by the first-wavelength-based measurement means coincides with the level of the light component obtained by the second-wavelength-based measurement means, and final correction means for fixing a positional relationship between the two waveguide components in the direction crossing the optical axis to the relative movement position discriminated by the coincident position discrimination means in order to complete correction for the center wavelength λg.

According to the 25th aspect, in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, the center wavelength λ0 of light output from this structure is measured. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

The temporary correction step obtains the difference between the center wavelength λ0 obtained by measurement done by the center wavelength measurement means and the center wavelength λg as the correction target is obtained, and at least one of the two waveguide components is temporarily moved, in accordance with the obtained difference, in the direction crossing the optical axis up to the relative position where the center wavelength λg should be obtained. By this movement, the center wavelength is brought near to the wavelength λg, although it has a slight error, thereby terminating temporary correction as coarse correction. Thereafter, fine correction concerning position is executed. In this correction, with reference to the position determined by temporary correction, light having the first wavelength λ1 shifted from the center wavelength λg as the correction target by a predetermined wavelength is incident on the waveguide component located on the incident side, and the level of light output via the channel waveguide array is measured while the relative position of the two waveguide components is changed in this state. In addition, light having the second wavelength λ2 on the opposite side of the wavelength λg as a middle point to the first wavelength λ1 is output, and similar measurement is performed. If a waveform having the wavelength λg as a peak has a symmetrical shape on the short wavelength side and long wavelength side with the wavelength λg as the center, the level measured at the first wavelength λ1 should coincide with that measured at the second wavelength λ2. The coincident position discrimination means discriminates a relative movement position at which the level of light obtained by the first-wavelength-based measurement means coincides with the level of light obtained by the second-wavelength-based measurement means, and the positional relationship between the two waveguide components in the direction crossing the optical axis is fixed to the discriminated relative movement position, thereby terminating correction for the center wavelength λg.

In the 25th aspect, since a relative position near the wavelength λg is found out by the temporary correction means, the minimum range of position movement (scanning) in measuring based on the first and second wavelengths λ1 and λ2 can be discriminated accurately to some extent. This eliminates unnecessary scanning operation. In addition, the slab waveguide is implemented as an arrayed waveguide diffraction grating or the like connected to a channel waveguide array as an optical part.

In order to achieve the above object, according to the 26th aspect of the present invention, there is provided a wavelength correction apparatus in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising center wavelength measurement means for causing light having a predetermined wavelength width to be incident from a waveguide component placed on an incident side, and measuring a center wavelength λ0 of light which has passed through a predetermined optical part connected to a waveguide component placed on an exit side, wavelength time-divisional measurement means for causing a light component having a first wavelength λ1 and a light component having a second wavelength λ2 which are symmetrical with respect to a target center wavelength λg to be alternately and periodically incident from the wavelength component placed on an incident side, and at the same time, measuring levels of light components output via the two waveguide components at each movement position while moving at least one of the two waveguide components in a direction crossing the optical axis, level comparison means for comparing the levels of the two light components output through the optical part, which are measured by the wavelength time-divisional measurement means, based on the wavelengths $\lambda 1$ and $\lambda 2$, and final correction means for fixing a positional relationship between the waveguide component placed on the incident side and the waveguide component placed on an exit side to a position where the levels of the two light components coincide with each other by the level comparison means in order to complete correction for the center wavelength $\lambda g$.

According to the 26th aspect, in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, the center wavelength $\lambda 0$ of light output from this structure is measured. In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

In the 26th aspect, since the center wavelength changes as the relative positional relationship between the two waveguide components changes, light components having the first and second wavelengths $\lambda 1$ and $\lambda 2$ are alternately and repeatedly output with the center wavelength $\lambda g$ as the correction target being a middle point, and an output level at each position in this relationship is measured. If a waveform having the wavelength $\lambda g$ as a peak has a symmetrical shape on the short wavelength side and long wavelength side with the wavelength $\lambda g$ as the center, the level measured at the first wavelength $\lambda 1$ should coincide with that measured at the second wavelength $\lambda 2$. The coincident position discrimination means discriminates a relative movement position at which the level of light obtained by the first-wavelength-based measurement means coincides with the level of light obtained by the second-wavelength-based measurement means, and the positional relationship between the two waveguide components in the direction crossing the optical axis is fixed to the discriminated relative movement position, thereby terminating correction for the center wavelength $\lambda g$.

According to the 27th aspect of the present invention, in the wavelength correction apparatus according to any one of the 23rd to 26th aspects, the interval between the first and second wavelengths $\lambda 1$ and $\lambda 2$ is a full-width at half-maximum of a spectrum, and a middle point between the wavelengths coincides with the wavelength $\lambda g$.

In the 27th aspect, the first and second wavelengths $\lambda 1$ and $\lambda 2$ may have values other than those described above. However, if the interval between the two wavelengths is set to the full-width at half-maximum of the spectrum, correction can be made at a position conforming to the definition of a center wavelength.

According to the 28th aspect of the present invention, in the wavelength correction apparatus according to the 25th aspect, a plurality of output waveguides are connected to the output side of the channel waveguide array via another slab waveguide, and the final correction means performs similar measurement to obtain the positional relationship with respect to light components respectively output from the plurality of output waveguides and fixes the positional relationship on the basis of the measurement result in order to terminate correction for the center wavelength $\lambda g$.

According to the 28th aspect, therefore, the center wavelength $\lambda g$ can be accurately corrected by, for example, averaging the correction results obtained on the respective output waveguides arranged on the output side of the channel waveguide array.

In order to achieve the above object, according to the 29th aspect of the present invention, there is provided an arrayed waveguide diffraction grating in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face, or a slab waveguide assembly formed by connecting another waveguide to the slab waveguide, wherein at the time of first measurement, when light having a first wavelength $\lambda 1$ shifted from a target center wavelength $\lambda g$ by a predetermined wavelength is incident on a waveguide component placed on an incident side, a level of light output at each movement position is measured while at least one the two waveguide components is moved in a direction crossing the optical axis, at the time of second measurement, when light having a second wavelength $\lambda 2$ symmetrical to the first wavelength $\lambda 1$ with respect to the center wavelength $\lambda g$ is incident from the waveguide component placed on the incident side, a level of light output via the two waveguide components is measured at each movement position while at least one of the two waveguide components is moved in a direction crossing the optical axis, and a positional relationship between the two waveguide components in the direction crossing the optical axis is so fixed as to set a relative movement position where the level of light obtained at the time of first measurement coincides with the level of light obtained at the time of second measurement in order to perform correction for the center wavelength $\lambda g$.

In a slab waveguide formed as one waveguide as a whole by combining two waveguide components with a predetermined end face which is so formed on one waveguide component as to cross an optical axis being placed to oppose an end face which is so formed on the other waveguide component so as to be parallel with the predetermined end face, or a slab waveguide assembly formed by connecting another waveguide to the slab waveguide, the first and second measurements are performed by using the arrayed waveguide diffraction grating according to the 29th aspect, and the positional relationship between the two waveguide components in the direction crossing the optical axis is fixed to the relative movement position where the levels of light components obtained by these measurements coincide with each other, thereby correcting the center wavelength $\lambda g$.

In this case, the two waveguide components may be obtained by cutting one slab waveguide or a slab waveguide assembly to which a waveguide is connected into two waveguides, or may be manufactured separately and their end faces are placed to oppose each other. In addition, these end faces may be formed by separating one slab waveguide into two waveguides or separating a slab waveguide assembly to which a waveguide portion is connected into two waveguides at the end face of the waveguide portion as a boundary.

According to the 30th aspect of the present invention, there is provided an arrayed waveguide diffraction grating according to the 29th aspect, wherein the slab waveguide and another slab waveguide are connected via a channel waveguide array.

According to the 30th aspect, the arrangement obtained by connecting the two slab waveguides to the channel waveguide array is also implemented by an arrayed waveguide diffraction grating.

In order to achieve the above object, according to the 31st aspect of the present invention, there is provided an interleaver comprising an input waveguide, two optical waveguides which are connected to one end of the input waveguide and demultiplex input wavelength multiplexed light into light components of odd-numbered wavelengths and light components of even-numbered wavelengths, and characteristic correction means for changing a characteristic of the optical waveguide such that a measurement result on an intensity of light emerging from the optical waveguide, which is obtained when light having a first wavelength $\lambda 1$ shifted from a specific wavelength by a predetermined wavelength is incident on at least one of the optical waveguides, coincides with a measurement result on an intensity of light emerging from the optical waveguide, which is obtained when light having a second wavelength $\lambda 2$ symmetrical to the first wavelength $\lambda 1$ with respect to the specific wavelength is incident.

According to the 31st aspect, the interleaver includes the characteristic correction means for correcting characteristics by measurement using the two wavelengths $\lambda 1$ and $\lambda 2$ having a predetermined relationship with at least one of the two optical waveguides.

According to the 32nd aspect of the present invention, in the interleaver according to the 31st aspect, the characteristic correction means is a resistor which is energized to heat the optical waveguide.

In the 32nd aspect, the characteristic correction means is a resistor which is energized to generate heat to correct the characteristics of the optical waveguide.

In order to achieve the above object, according to the 33rd aspect of the present invention, three is provided an interleaver comprising an input waveguide and two optical waveguides which are connected to one end of the input waveguide and demultiplex input wavelength multiplexed light into light components of odd-numbered wavelengths and light components of even-numbered wavelengths, wherein at least one of the two optical waveguides is made of a material which changes a wavelength selection characteristic upon being heated or irradiated with ultraviolet light, and the characteristic of the optical waveguide is corrected by performing the heating or irradiation of ultraviolet light until a measurement result on an intensity of light emerging from the optical waveguide, which is obtained when light having a first wavelength $\lambda 1$ shifted from a specific wavelength by a predetermined wavelength is incident on the optical waveguide via the input waveguide, coincides with a measurement result on an intensity of light emerging from the optical waveguide, which is obtained when light having a second wavelength $\lambda 2$ symmetrical to the first wavelength $\lambda 1$ with respect to the specific wavelength is incident.

According to the 33rd aspect, at least one of the two optical waveguides connected to the input waveguide of the interleaver is made of a material which changes the wavelength selection characteristic upon heating or irradiation of ultraviolet light, and characteristics are corrected by measurement using the two wavelengths $\lambda 1$ and $\lambda 2$ having a predetermined relationship.

As obvious from the above aspects, according to the first aspect, second to fifth aspects, seventh aspect, eighth aspect, and 17th to 19th aspects, light having the first wavelength $\lambda 1$ shifted from the center wavelength $\lambda g$ as the correction target by the predetermined wavelength is incident on the waveguide component on the incident side. In this state, the level of output light is measured while the relative position of the two waveguide components is changed. In addition, light having the second wavelength $\lambda 2$ on the opposite side of the wavelength $\lambda g$ as a middle point to the first wavelength $\lambda 1$ is output, and similar measurement is performed. In the coincident position discrimination step, a relative movement position where the levels of the two light components coincide with each other is discriminated, and the positions of the two waveguide components in the direction crossing the optical axis are fixed to the discriminated relative movement position, thereby terminating correction of the center wavelength $\lambda g$. This easily and quickly realizes correction.

According to the second aspect, sixth aspect, 20th aspect, or 26th aspect, since the first and second wavelengths $\lambda 1$ and $\lambda 2$ are time-divisionally measured, it suffices to move the relative position of the two waveguide components once. This makes it possible to realize quicker correction.

According to the fourth aspect or 22nd aspect, in the final correction step, measurement for obtaining a positional relationship is performed with respect to the light components respectively output from a plurality of output waveguides, and the positional relationship is fixed in accordance with the measurement results, thereby terminating correction of the center wavelength $\lambda g$. This makes it possible to accurately correct the center wavelength $\lambda g$ in the overall optical element.

According to the fifth aspect or 23rd to 25th aspects, light having the first wavelength $\lambda 1$ shifted from the center wavelength $\lambda g$ as the correction target by the predetermined wavelength is incident on the waveguide component on the incident side. In this state, the level of output light is measured while the relative position of the two waveguide components is changed. In addition, light having the second wavelength $\lambda 2$ on the opposite side of the wavelength $\lambda g$ as a middle point to the first wavelength $\lambda 1$ is output, and similar measurement is performed. The coincident position discrimination means discriminates a relative movement position where the levels of the two light components coincide with each other, and the positions of the two waveguide components in the direction crossing the optical axis are fixed to the discriminated relative movement position, thereby terminating correction of the center wavelength $\lambda g$. This easily and quickly realize correction.

According to the eighth aspect or 28th aspect, the final correction means performs measurement for obtaining a positional relationship with respect to the light components respectively output from a plurality of output waveguides, and the positional relationship is fixed in accordance with the measurement results, thereby terminating correction of the center wavelength $\lambda g$. This makes it possible to accurately correct the center wavelength $\lambda g$ in the overall optical element.

According to ninth aspect or 12th aspect, the characteristics of a waveguide from which light having a predetermined wavelength is to be output can be easily and quickly corrected by using light components having two different wavelengths.

In addition, according to the 15th aspect or 16th aspect, whether a specific waveguide has a desired wavelength characteristic can be easily and quickly determined by using light components having two different wavelengths.

Furthermore, the arrayed waveguide diffraction grating according to the 29th aspect or 30th aspect includes a slab waveguide constituted by two waveguide components, various types of slab waveguides can be formed by properly selecting and using these waveguide components. In addition, a slab waveguide can be efficiently formed from one wafer. Since the characteristics of the arrayed waveguide diffraction grating are corrected by measurement using the two wavelengths λ1 and λ2 having a predetermined relationship, an improvement in productivity and a reduction in cost can be attained.

Moreover, according to the interleaver of the 31st to 33rd aspects, since the characteristics can be corrected by measurement using the two wavelengths λ1 and λ2 having a predetermined relationship, an improvement in productivity and a reduction in cost can be attained.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Several preferred embodiments of the present invention will be described in detail below with reference to the accompanying drawings.

First Embodiment

Figure 4:
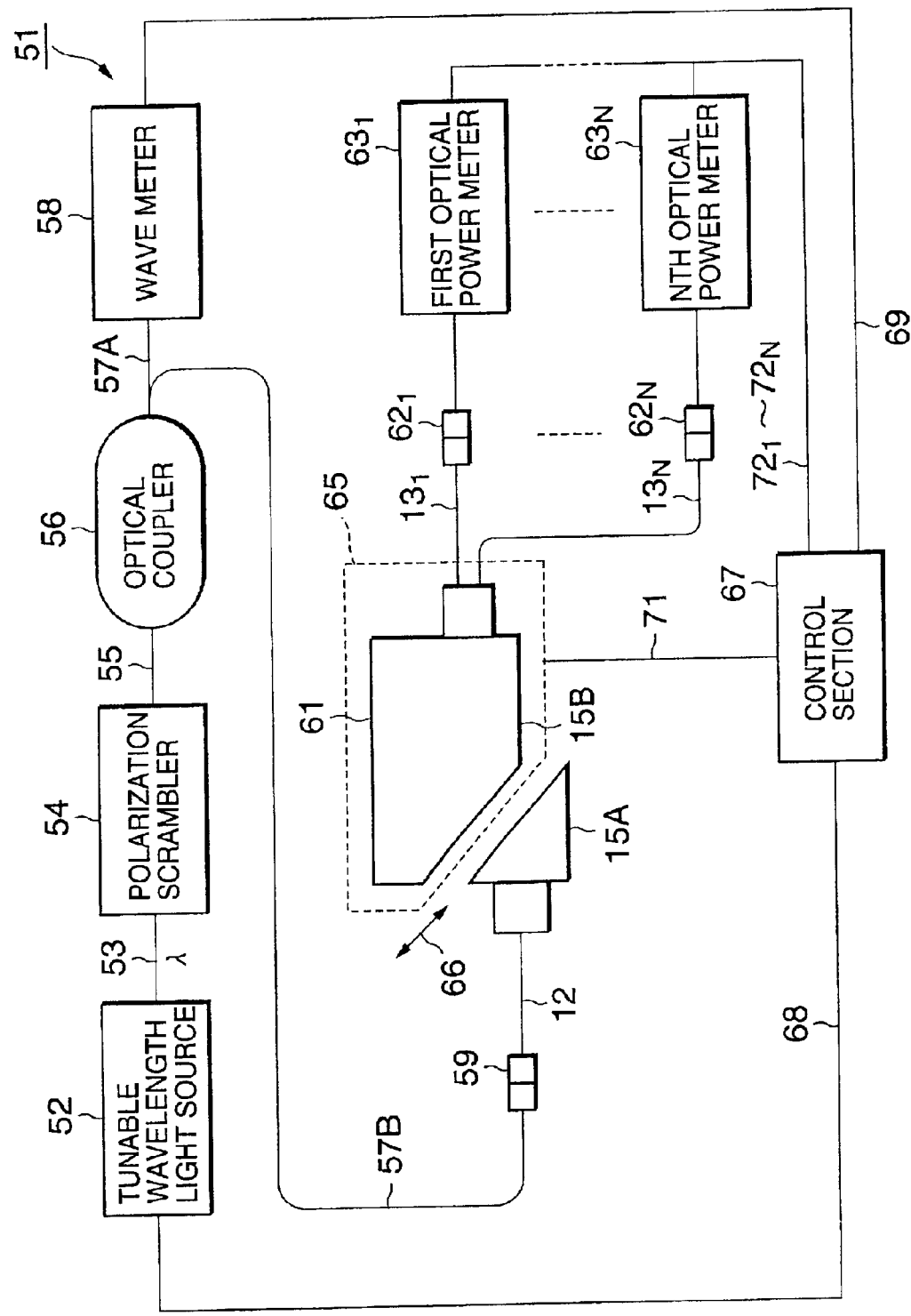
FIG. 4 is a block diagram showing the schematic arrangement of a wavelength correction apparatus according to the first embodiment of the present invention.

FIG. 4 shows the arrangement of a wavelength correction apparatus according to the first embodiment of the present invention. A wavelength correction apparatus 51 includes a tunable wavelength light source (TLS) 52. Light 53 having a predetermined wavelength (λ) output from the tunable wavelength light source 52 is input to a polarization scrambler (SCR) 54. The polarization scrambler 54 converts a polarized laser beam into unpolarized light. In general, an AWG has polarization dependence. If, therefore, a laser beam is polarized, the characteristics of the AWG measured change depending on the state of polarization. For this reason, a polarization scrambler is used to average polarization states so as to allow stable measurement independent of the polarization of a laser beam. Light 55 having the wavelength λ output from the polarization scrambler 54 is input to an optical coupler 56. The optical coupler 56 is an optical part for branching light into two optical fibers at a predetermined ratio. One light component 57A branched by the optical coupler 56 is input to a wavemeter (OWM) 58, which measures the wavelength of the input light.

Figure 1:
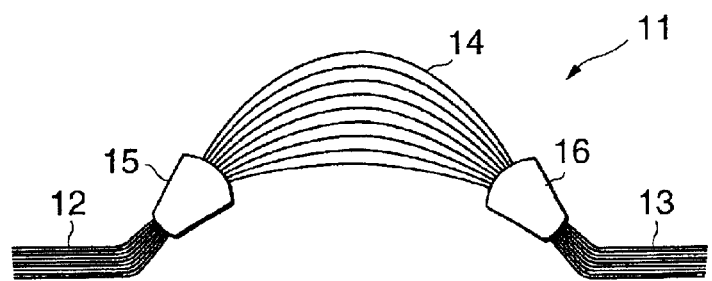
FIG. 1 is a view for explaining the overall arrangement of a conventional arrayed waveguide diffraction grating.
Figure 2:
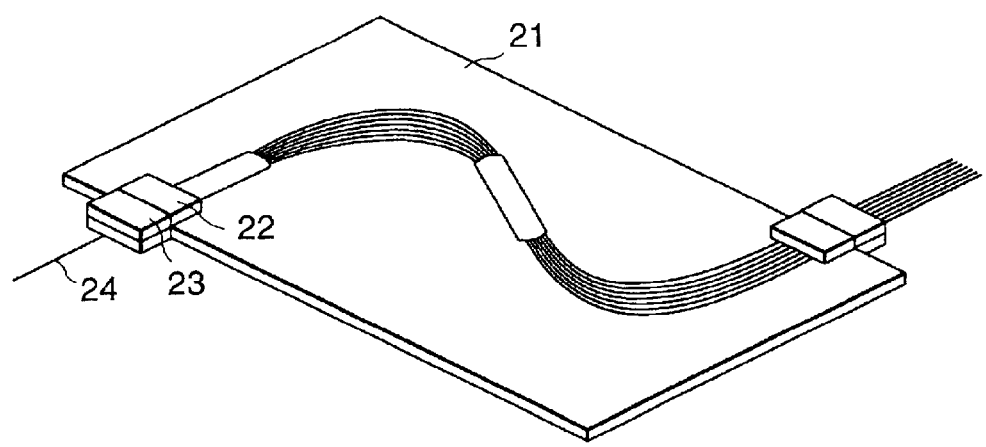
FIG. 2 is a perspective view showing a proposed conventional arrayed waveguide diffraction grating.
Figure 3:
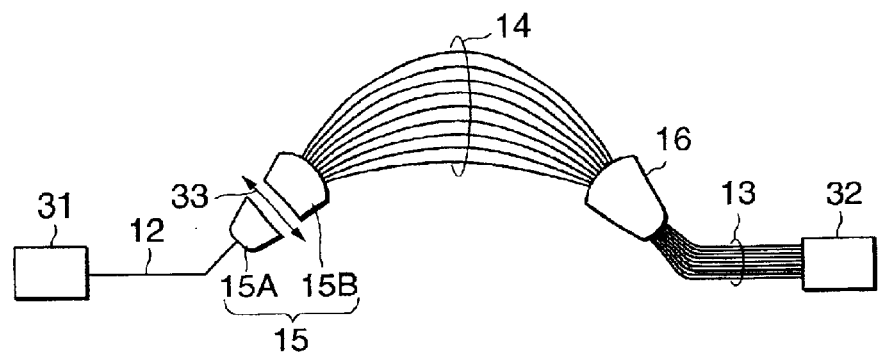
FIG. 3 is a view for explaining how slab centering is performed by the arrayed waveguide diffraction grating shown in FIG. 2.

The other light component 57B branched by the optical coupler 56 is input to an input waveguide 12 (see FIG. 3) of an arrayed waveguide diffraction grating (AWG) 61 via an optical connector 59. The arrayed waveguide diffraction grating 61 has its input-side slab waveguide divided into a first input-side waveguide component 15A and second input-side waveguide component 15B, as shown in FIG. 3. First to Nth output waveguides $13_1$ to $13_N$ of the arrayed waveguide diffraction grating 61 are respectively connected to first to Nth optical power meters (OPMs) $63_1$ to $63_N$ via first to Nth optical connectors $62_1$ to $62_N$ arranged in correspondence with the respective output waveguides. In this case, the numerical value N represents the number of channels of the first to Nth output waveguides $13_1$ to $13_N$ of the arrayed waveguide diffraction grating 61.

The first input-side waveguide component 15A of the arrayed waveguide diffraction grating 61 in this embodiment is fixed on a stationary member (not shown), whereas the second input-side waveguide component 15B can be moved freely by a moving mechanism 65 in a cutting direction 66 with respect to the first input-side waveguide component 15A. A control section 67 outputs a wavelength control signal 68 for controlling the wavelength λ of the light 53 output from the tunable wavelength light source 52, and monitors the light 53 output from the tunable wavelength light source 52 upon reception of a wavelength monitor signal 69 from the wavemeter 58. The control section 67 also controls the movement of the moving mechanism 65 by using a movement control signal 71, and concurrently receives power detection signals $72_1$ to $72_N$ supplied from the first to Nth optical power meters $63_1$ to $63_N$.

Figure 5:
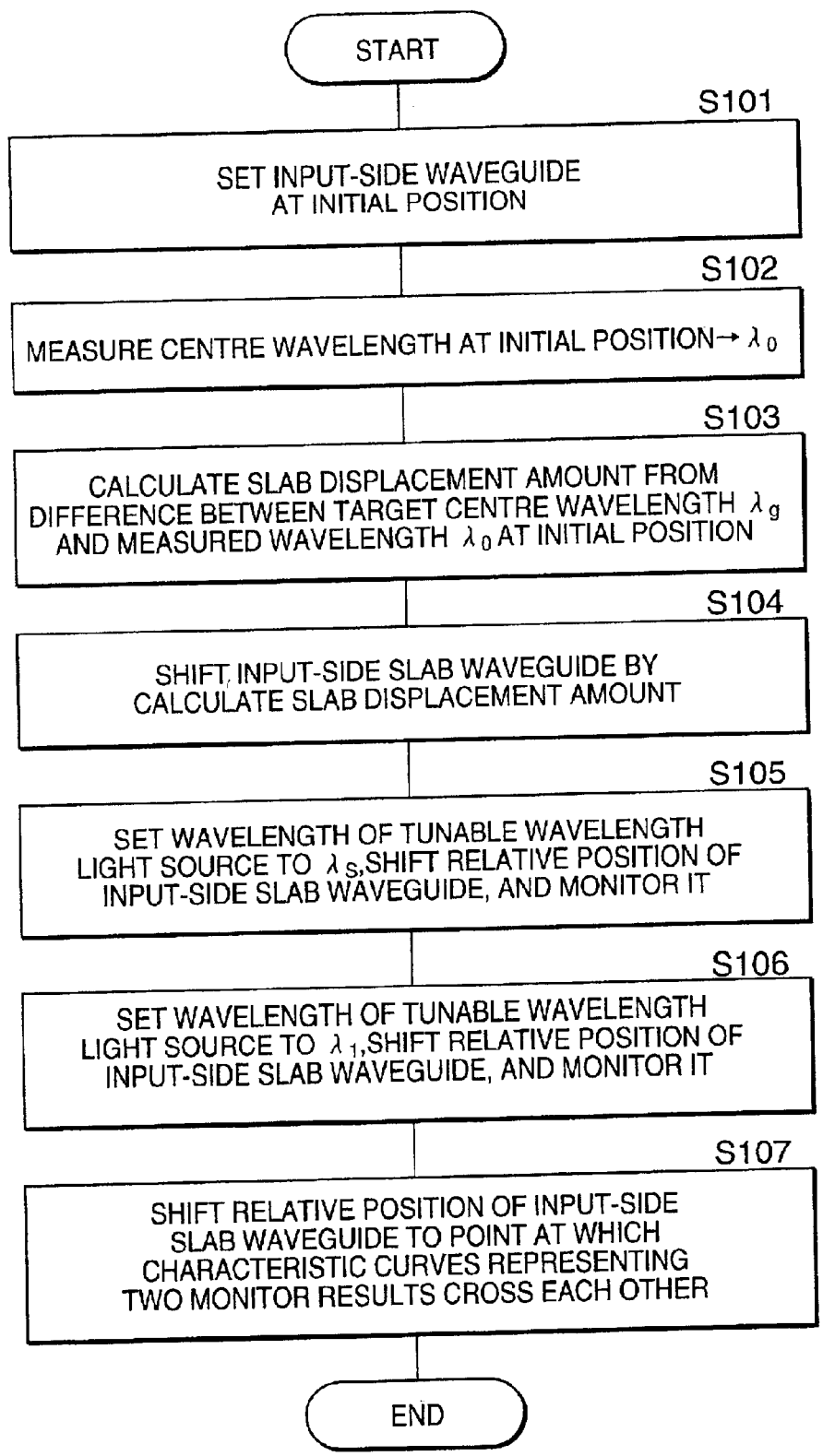
FIG. 5 is a flow chart showing a procedure for measurement by the wavelength correction apparatus according to this embodiment.

FIG. 5 is a flow chart showing a procedure for measurement by the wavelength correction apparatus having the above arrangement. In this embodiment, the center wavelength of the arrayed waveguide diffraction grating 61 for the full width at half maximum (FWHM) W of the spectrum is corrected to a target center wavelength $\lambda g$ by slab centering. In step S101, the relative position of the first input-side waveguide component 15A and second input-side waveguide component 15B of an input-side slab waveguide 15 (see FIG. 3) is set to an initial position (step S101). The positional relationship between the two components is arbitrary.

In this initial position state, a wavelength $\lambda 0$ of light output from the arrayed waveguide diffraction grating 61 is measured (step S102). In this embodiment, as shown in FIG. 4, the tunable wavelength light source 52 is connected to the arrayed waveguide diffraction grating 61 via the optical connector 59. Measurement is therefore performed by using this tunable wavelength light source 52 and the first to Nth optical power meters $63_1$ to $63_N$ connected via the remaining first to Nth optical connectors $62_1$ to $62_N$. However, measurement of the center wavelength $\lambda 0$ is not limited to this. As has already been described with reference to FIG. 3, the center wavelength $\lambda 0$ may be measured by using an ASE light source 31 or another method.

When measurement is to be performed by using the tunable wavelength light source 52 and first to Nth optical power meters $63_1$ to $63_N$, the wavelength of the tunable wavelength light source 52 is continuously changed within a predetermined wavelength range, and the amounts of light transmitted are obtained by the first to Nth optical power meters $63_1$ to $63_N$ at the respective wavelengths. The peak of the amounts of light transmitted is then obtained, and the center wavelength $\lambda 0$ is measured from the wavelength at a position where the output decreases from the peak value by 3 dB (decibel).

Figure 6:
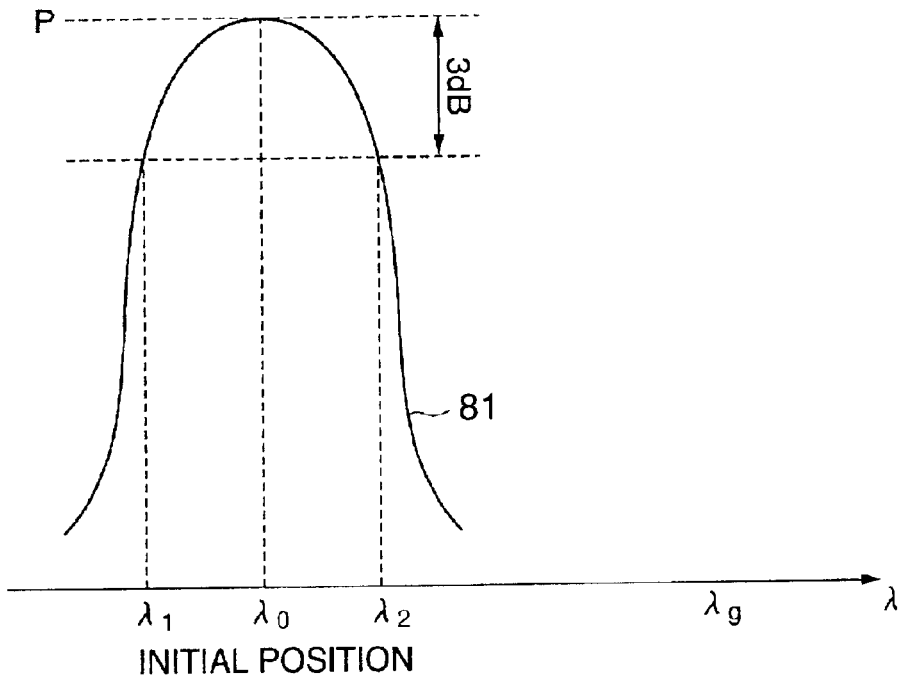
FIG. 6 is a graph for explaining the relationship between measurement of a center wavelength λ0 and a target wavelength λg.

FIG. 6 shows the relationship between measurement of the center wavelength $\lambda 0$ and the target wavelength $\lambda g$. In this case, a curve 81 represents the amounts of light transmitted which are measured by the first to Nth optical power meters $63_1$ to $63_N$ (see FIG. 4) on the basis of changes in wavelength $\lambda$. It is difficult to specify a wavelength at which the amount of light transmitted becomes peak from the curve 81 itself. For this reason, wavelengths $\lambda 1$ and $\lambda 2$ at the position where the amount of light transmitted decreases from a peak value P by 3 dB are measured, and the average value of the measured wavelengths is set as the center wavelength $\lambda 0$.

The initial position is a temporary measurement position, and hence does not require sufficient positional precision. For this reason, measurement need not be performed by using all the first to Nth optical power meters $63_1$ to $63_N$, and may be easily done by using one representative power meter. Likewise, the center wavelength $\lambda 0$ need not always be measured at the position where the output decreases from the peak value P by 3 dB.

In general, the center wavelength $\lambda 0$ obtained at the initial position differs from the target wavelength $\lambda g$. For this reason, a difference $\Delta \lambda$ between the two wavelengths is obtained from equation (2), and a slab displacement amount at which the center wavelength should become the wavelength $\lambda g$ is calculated by using data about a shift amount with respect to various wavelength differences $\Delta \lambda$ that have already been measured (step S103 in FIG. 5).

$$\Delta\lambda=|(\lambda 0-\lambda g)| \qquad (2)$$

The relative position of the first input-side waveguide component 15A and second input-side waveguide component 15B is then moved by this slab displacement amount (step S104). According to equation (2), an absolute value is obtained as a slab displacement amount. If, however, one value is simply subtracted from the other value, a moving direction can be determined depending on whether the resultant value is positive or negative.

By moving the relative position of the first input-side waveguide component 15A and second input-side waveguide component 15B in this manner, the center wavelength almost coincides with the wavelength $\lambda g$ in accordance with the positional relationship after movement. With this operation, the first step of correction is terminated.

In order to perform position correction with higher precision, the second step of correction is started. First of all, the wavelength ($\lambda$) of the light 53 output from the tunable wavelength light source 52 shown in FIG. 4 is set to a wavelength $\lambda s$ given by equation (3). The relative position of the first input-side waveguide component 15A and second input-side waveguide component 15B is then moved within a predetermined range while the light 53 with the wavelength $\lambda s$ is incident on the first input-side waveguide component 15A through the input waveguide 12. Changes in the amount of light transmitted at this time are concurrently measured by the first to Nth optical power meters $63_1$ to $63_N$ with respect to all the channels of the first to Nth output waveguides $13_1$ to $13_N$ (step S105).

$$\lambda s=\lambda g-(W/2) \qquad (3)$$

where W is the full width at half maximum of the spectrum.

Subsequently, the wavelength of the light 53 output from the tunable wavelength light source 52 is set to the wavelength $\lambda 1$ given by equation (4). The relative position of the first input-side waveguide component 15A and second input-side waveguide component 15B is then moved within a predetermined range while the light 53 with the wavelength $\lambda 1$ is incident on the first input-side waveguide component 15A through the input waveguide 12. Changes in the amount of light transmitted at this time are concurrently measured by the first to Nth optical power meters $63_1$ to $63_N$ with respect to all the channels of the first to Nth output waveguides $13_1$ to $13_N$ (step S106).

$$\lambda 1=\lambda g+(W/2) \qquad (4)$$

Figure 7:
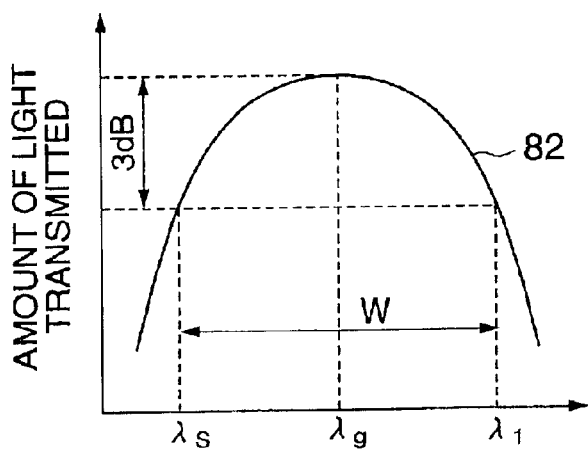
FIG. 7 is a graph for explaining the relationship between three wavelengths λg, λs, and λ1.

FIG. 7 shows the relationship between the three wavelengths $\lambda g$, $\lambda s$, and $\lambda 1$ described above. Referring to FIG. 7, the ordinate represents the amount of light transmitted; and the abscissa, the wavelength $\lambda$. The wavelengths at the position where the output decreases from the peak amount of light transmitted by 3 dB are wavelength $\lambda s$, and $\lambda 1$. The interval between these wavelengths is the full width at half maximum W of a spectrum 82. Assume that the center wavelength $\lambda 0$ is defined as the average wavelength between the wavelengths $\lambda s$ and $\lambda 1$. In this case, when the values measured at the wavelengths $\lambda s$ and $\lambda 1$ become equal, the center wavelength $\lambda 0$ coincides with the wavelength $\lambda g$. In addition, if the spectrum 82 is symmetrical about the wavelength at which the amount of light transmitted reaches its peak, the center wavelength $\lambda 0$ coincides with the wavelength at which the amount of light transmitted reaches its peak. In this case, therefore, when the values measured at the wavelengths $\lambda s$ and $\lambda 1$ become equal to each other, the wavelengths $\lambda 0$, the wavelength $\lambda g$, and the wavelength at which the amount of light transmitted reaches its peak coincide with each other.

Figure 8:
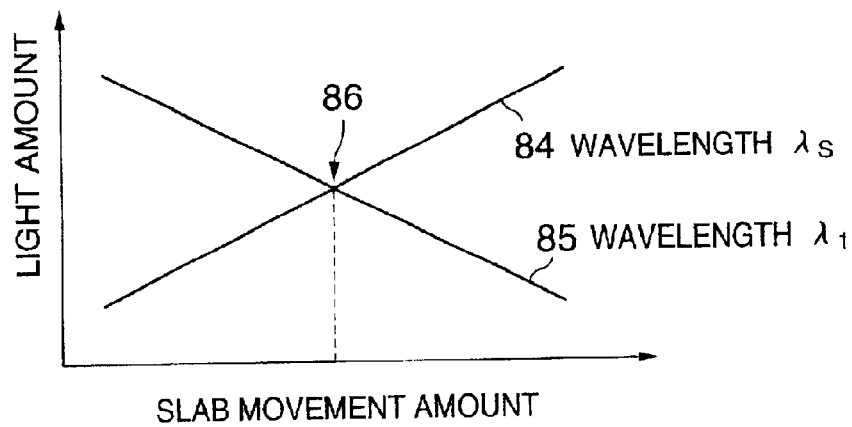
FIG. 8 is a graph showing monitor results on the wavelengths λs and λ1 in steps S105 and S106 in FIG. 5.

FIG. 8 shows the monitor result on the wavelengths $\lambda s$ and $\lambda 1$ in steps S105 and S106 in FIG. 5. Referring to FIG.

8, the ordinate represents the amount of light transmitted, i.e., the amount of light received, measured by one target optical power meter (to be referred to as an optical power meter $63_X$ hereinafter) of the first to Nth optical power meters $63_1$ to $63_N$ in FIG. 4; and the abscissa, the slab movement amount obtained when the wavelength of the tunable wavelength light source 52 is set to the wavelengths λs and λ1. A position 86 where a characteristic line 84 representing the characteristic associated with the wavelength λs crosses a characteristic line 85 representing the characterized associated with the wavelength λ1 is a position where the amount of light at the wavelength λs is equal to that at the wavelength λ1. This wavelength is the target wavelength λg. Considering the optical power meter $63_X$ alone, if the relative position of the first input-side waveguide component 15A and second input-side waveguide component 15B is shifted to the position 86 where the characteristic lines 84 and 85 representing the two monitor results cross each other, the wavelength is corrected to the center wavelength λg at this position (step S107 in FIG. 5).

Figure 9:
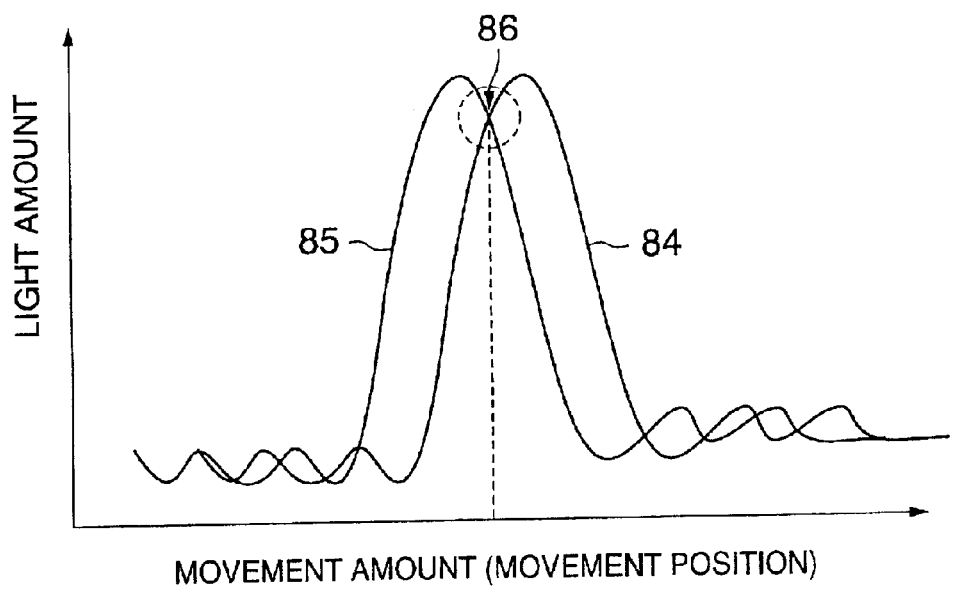
FIG. 9 is a graph showing the overall waveforms of light components having the two wavelengths λs and λ1 used for the measurement in the first embodiment.

FIG. 9 shows the overall waveforms of the two wavelengths λs and λ1 used for measurement in this embodiment. Referring to FIG. 9, the ordinate represents the amount of light; and the abscissa, the movement amount or position in the cutting direction 66 which is achieved by the moving mechanism 65 in FIG. 4. FIG. 8 is an enlarged view of the range indicted by the dashed line in FIG. 9, which is centered at the position 86 where the characteristic line 84 representing the first wavelength λs on the short wavelength side crosses the characteristic line 85 representing the second wavelength λ1 on the long wavelength side. There are several points, other than the position 86, at which the two characteristic lines 84 and 85 cross, when such points are simply obtained. For this reason, an initial position is determined in step S101 to specify a crossing point.

Figure 10:
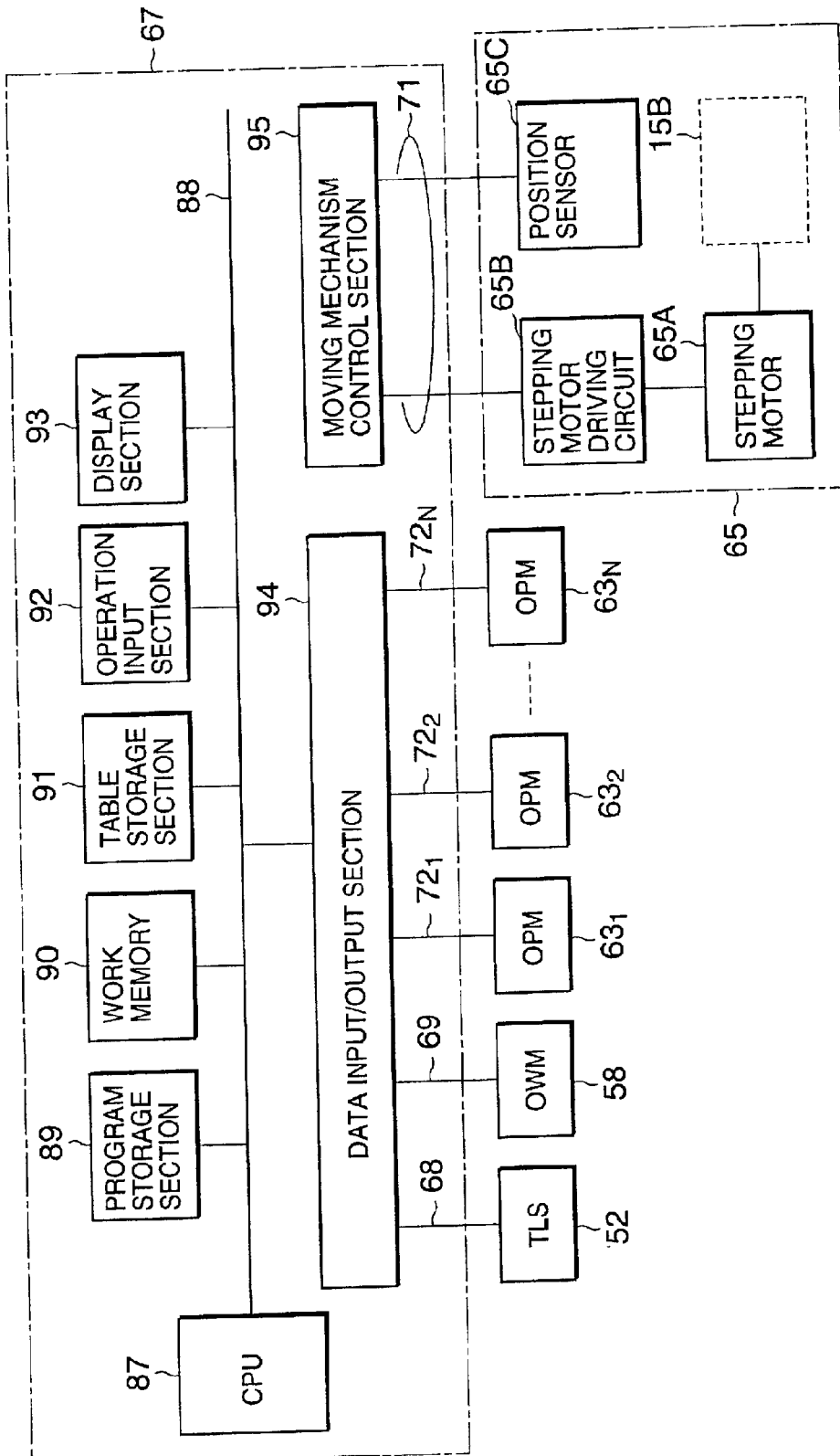
FIG. 10 is a block diagram showing the detailed arrangement of a control section and its peripheral devices in this embodiment.

FIG. 10 is a block diagram showing the detailed arrangement of a control section for performing the above control and its peripheral devices. The control section 67 shown in FIG. 4 as well has almost the same arrangement as that of a general personal computer, and includes a CPU (Central Processing Unit) 87. The CPU 87 is connected to various circuit components via a bus 88. Of these components, a program storage section 89 is a storage section storing programs for executing various control operations done by the control section 67. In general, the program storage section 89 is formed from a storage medium such as a ROM (Read Only Memory) or hard disk. A working memory 90 is a storage area in which data are temporarily stored when the CPU 87 performs various control operations. The working memory 90 is generally formed from a storage medium such as a RAM (Random Access Memory) or hard disk. A table storage section 91 is a storage area in which various tables or permanent data are stored. The table storage section 91 is generally formed from a nonvolatile storage medium such as a hard disk or a RAM backed up by a battery. An operation input section 92 is formed from a data input device such as a keyboard or mouse (not shown). A display section 93 is formed from an apparatus for displaying data, e.g., a CRT or liquid crystal display.

A data input/output section 94 is an interface circuit for inputting/outputting data to/from the respective components of the wavelength correction apparatus 51 (FIG. 4). The data input/output section 94 is designed to send the wavelength control signal 68 for controlling the wavelength (λ) of the light 53 output from the tunable wavelength light source 52 and receive the wavelength monitor signal 69 from the wavemeter 58. In addition, the data input/output section 94 is designed to receive the power detection signals $72_1$ to $72_N$ from the first to Nth optical power meters (OPMs) $63_1$ to $63_N$. A moving mechanism control section 95 controls the moving mechanism 65 in accordance with the movement control signal 71.

In this case, the moving mechanism 65 includes a stepping motor 65A for moving the second input-side waveguide component 15B with respect to the first input-side waveguide component 15A (see FIG. 4), a stepping motor driving circuit 65B for driving the stepping motor 65A, and a position sensor 65C for detecting the position of the second input-side waveguide component 15B relative to the first input-side waveguide component 15A. One or a plurality of position sensors 65C may be used. In this embodiment, marks (not shown) are formed on both the second input-side waveguide component 15B and the first input-side waveguide component 15A to set the second input-side waveguide component 15B to a predetermined initial position relative to the first input-side waveguide component 15A, and these marks are made to coincide with each other through the position sensor 65C to set an initial position. Position detection accompanying movement upon setting of the initial position is done on the basis of the number of driving pulses supplied to the stepping motor 65A.

Figure 11A:
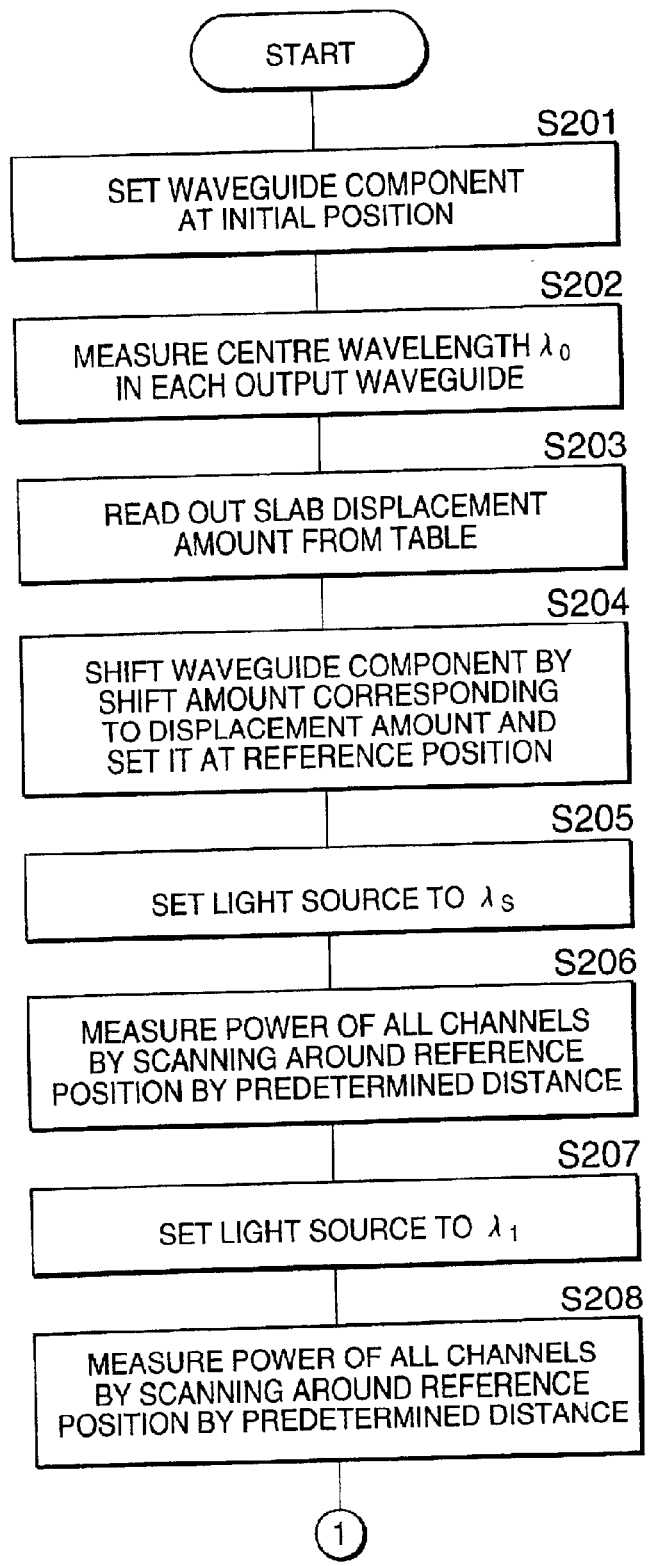
FIG. 11A is a flow chart showing the first half of an outline of the flow of wavelength correction control by the control section.
Figure 11B:
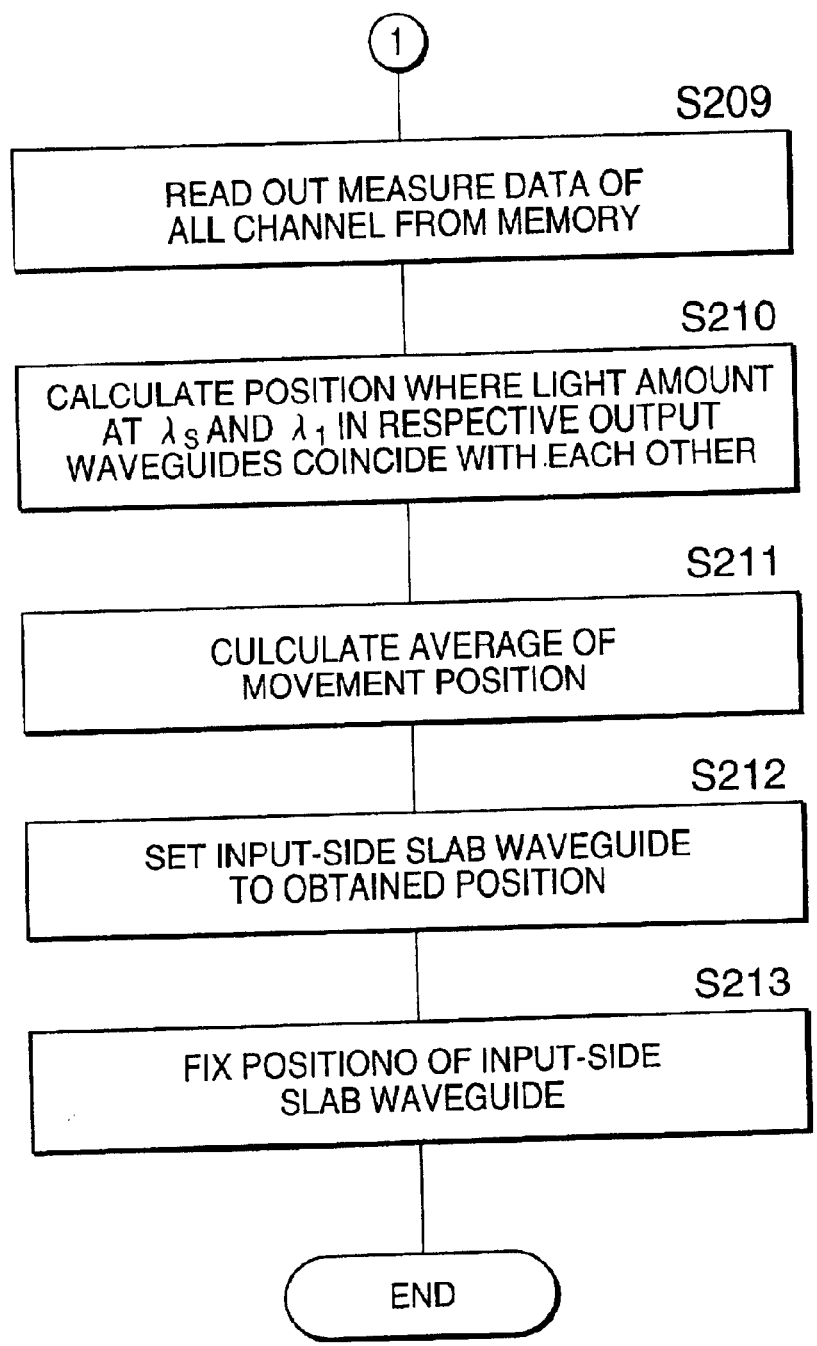
FIG. 11B is a flow chart showing the second half of the outline of the flow of wavelength correction control by the control section.

FIGS. 11A and 11B are flow charts showing an outline of the flow of wavelength correction control executed by the control section. The moving mechanism control section 95 shown in FIG. 10 sends a control signal to the stepping motor driving circuit 65B while monitoring the detection output from the position sensor 65C in FIG. 10, thereby setting the second input-side waveguide component 15B to the initial position by detecting the marks (step S201). In this state, the CPU 87 receives the power detection signals $72_1$ to $72_N$ output from the first to Nth optical power meters $63_1$ to $63_N$ through the data input/output section 94 to measure the center wavelengths λ0 with respect to all the first to Nth output waveguides $13_1$ to $13_N$ (step S202).

When the measurement of the center wavelengths λ0 is completed, the CPU 87 reads out a slab displacement amount from a correspondence table (not shown) stored in advance in the table storage section 91 on the basis of the average value of the measured wavelengths (or one typical value obtained by an arbitrary optical power meter $63_X$) and the target wavelength λg (step S203). Note that the correspondence table is a table in which slab displacement amounts are made to correspond to combinations of various center wavelengths λ0 and wavelengths λg based on actually measured values.

When a slab displacement amount is obtained, the moving mechanism control section 95 moves the second input-side waveguide component 15B by a movement amount corresponding to the slab displacement amount (step S204). The position after this movement will be referred to as a reference position. As described above, the reference position is relatively close to the final set position. When the second input-side waveguide component 15B is set at the reference position, the CPU 87 sets the light 53 output from the tunable wavelength light source 52 to the wavelength λs in accordance with the wavelength control signal 68 (step S205). The wavelength λ of the light 53 output from the tunable wavelength light source 52 can be checked and controlled to the wavelength λs by using the wavemeter 58.

When the wavelength λ is set to the wavelength λs on the short wavelength side, the moving mechanism control section 95 controls the moving mechanism 65 in accordance with the movement control signal 71 and moves the second input-side waveguide component 15B by a distance corresponding to a wavelength width equal to or more than the full-width at half-maximum W of the spectrum with respect to the reference position. Power detection signals 72 in all the channels which are obtained from the first to Nth optical power meters $63_1$ to $63_N$ are stored in the working memory 90 in correspondence with pieces of position information which are the numbers of driving pulses supplied to the stepping motor 65A for this movement (step S206). Scanning operation associated with the position of the second input-side waveguide component 15B is done in the range of a wavelength shorter than the wavelength at the reference position by a predetermined amount and a wavelength longer than that by a predetermined amount. Therefore, the CPU may directly move the second input-side waveguide component 15B to the scan start position and start scanning instead of performing control to move the component 15B to the reference position.

When the measurement of the wavelength λs on the short wavelength side is completed in the above manner, the light 53 output from the tunable wavelength light source 52 is set to the wavelength λ1 on the long wavelength side (step S207). Likewise, the moving mechanism control section 95 controls the moving mechanism 65 in accordance with the movement control signal 71 and moves the second input-side waveguide component 15B by a distance corresponding to a wavelength width equal to or more than the full-width at half-maximum W of the spectrum with respect to the reference position. The power detection signals 72 in all the channels which are obtained from the first to Nth optical power meters $63_1$ to $63_N$ are stored in the working memory 90 in correspondence with pieces of position information which are the numbers of driving pulses supplied to the stepping motor 65A for this movement (step S208).

Note, however, that this scanning operation in step S208 need not be performed at the same width as that in step S206. As described with reference to FIG. 8, it suffices to obtain a movement position where the mount of light with the wavelength λs is equal to that of light with the wavelength λ1. Depending on the apparatus used, therefore, scanning can be completed when values in all the channels of the first to Nth output waveguides $13_1$ to $13_N$ are confirmed upon monitoring them in all the channels.

When the measurement in association with the wavelength λ1 is completed in this manner, the CPU 87 reads out the measurement data about all the channels, obtained by the first to Nth optical power meters $63_1$ to $63_N$, from the working memory 90 (step S209 in FIG. 11B). The CPU 87 then calculates a movement position where the amount of light with the wavelength λs becomes equal to that of light with the wavelength λ1 with respect to each of the first to Nth output waveguides $13_1$ to $13_N$ (step S210). The CPU 87 calculates a movement position with respect to the whole first to Nth output waveguides $13_1$ to $13_N$ from these data (step S211). In this calculation, the simple average value of the calculation results on the respective channels may be calculated or an optimal movement position from the reference position may be calculated by assigning weights on the basis of the frequencies of use of the first to Nth output waveguides $13_1$ to $13_N$. Assume that some measurement values greatly differ from the remaining measurement values. In this case, after such values are omitted, an optimal movement position from the reference position can be calculated. In contrast to this, depending on the apparatus used, a good effect can be obtained by adjusting a movement position so as to obtain a desired characteristic in a channel exhibiting the worst value.

In this embodiment, since measurement is done with respect to all the channels of the first to Nth output waveguides $13_1$ to $13_N$, whether the characteristics of the arrayed waveguide diffraction grating 61 as a measurement target are good or not can be determined by checking these measurement results. If, therefore, the calculation result on the movement position of a given channel of the first to Nth output waveguides $13_1$ to $13_N$ exceeds a predetermined allowable range or a measurement is determined as faulty, the subsequent processing for the corresponding arrayed waveguide diffraction grating 61 may be stopped, and error display may be performed. This arrayed waveguide diffraction grating may then be removed from a list of products to be commercialized.

When a movement position is obtained in step S211, the moving mechanism control section 95 moves the second input-side waveguide component 15B from the reference position to the calculated position in accordance with an instruction from the CPU 87 (step S212). These movement control operations are done on the basis of the number of driving pulses supplied to the stepping motor 65A. Positioning can be done with sufficient precision by properly setting a reduction ratio for the moving mechanism. When positioning is completed, the positional relationship between the first input-side waveguide component 15A and the second input-side waveguide component 15B is fixed (step S213). In this case, depending on the apparatus used, the step of bonding these components with an adhesive may be executed. Alternatively, these components may be temporarily fixed with a tape or the like.

In the first embodiment described above, the center wavelength of the arrayed waveguide diffraction grating is corrected by adjusting the positional relationship between the first input-side waveguide component 15A and the second input-side waveguide component 15B which are cut from each other in a direction almost perpendicular to the optical axis of the input-side slab waveguide. However, the present invention is not limited to this. For example, the angle at which the input-side slab waveguide is cut need not be perpendicular to the optical axis; the waveguide can be cut at an arbitrary angle. In addition, the slab waveguide to be cut need not be the input-side waveguide connected to the channel waveguide array. An optical component incorporating a slab waveguide may be used as long as its optical characteristics change upon adjustment of the position where the slab waveguide is joined.

In the first embodiment, the joining position of the slab waveguide is obtained by using the tunable wavelength light source. However, light beams having two specific wavelengths may be separately output. In addition, in this embodiment, optical power meters 63 equal in number to all the channels of the first to Nth output waveguides $13_1$ to $13_N$ are prepared, and processing for all the channels is done at once. However, fewer optical power meters 63 may be prepared to repeat measurement while switching the channels.

Furthermore, in this embodiment, measurement is performed after wavelengths are set on the short wavelength side and long wavelength side in steps S206 and S208 in FIG. 11A. However, the position where the slab waveguide is to be joined may be moved and measured while two kinds of light beams are time-divisionally input. This makes it possible to perform measurement with one scanning operation (moving operation). This processing will be briefly described below as a modification.

Modification of First Embodiment

Figure 12:
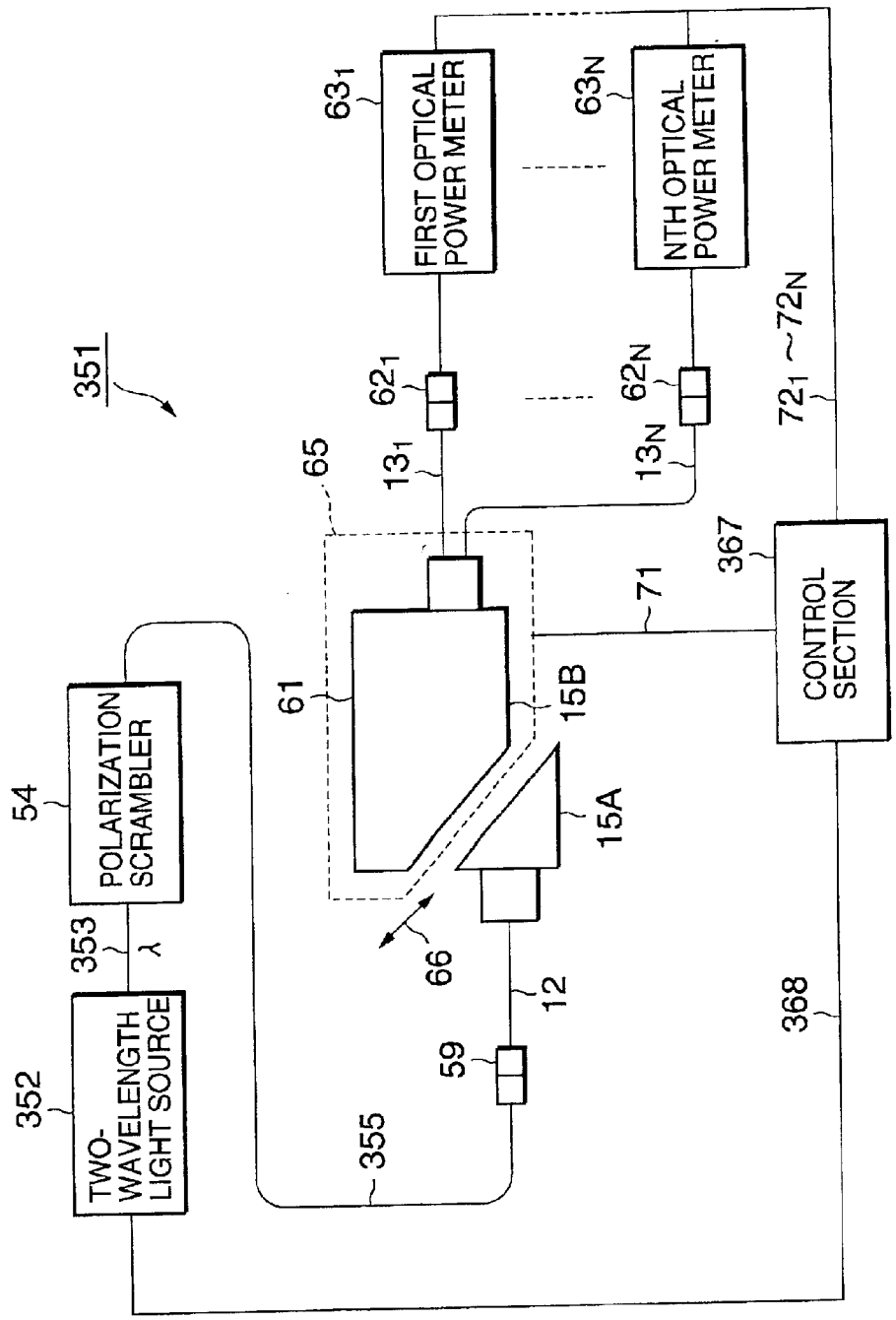
FIG. 12 is a block diagram showing an outline of the arrangement of a wavelength correction apparatus according to a modification of the present invention.

FIG. 12 shows the arrangement of a wavelength correction apparatus according to a modification of the first embodiment. The same reference numerals as in FIG. 12 denote the same parts in FIG. 4, and a description thereof will be omitted.

In a wavelength correction apparatus 351 of this modification, a two-wavelength light source 352 repeatedly emits the first wavelength λs on the short wavelength side and the second wavelength λ1 on the long wavelength side, centered on the wavelength λg as a target for correction in the first embodiment, in a time-divisional manner. The two-wavelength light source 352 may be designed to alternately emit the two wavelengths λs and λ1 or may have light sources that separately emit the wavelengths λs and λ1 and a selection means for selecting one of the light sources.

Light 353 output from the two-wavelength light source 352 is input to the polarization scrambler (SCR) 54. Light beams 355 having the wavelengths λs and λ1 output from the polarization scrambler 54 and periodically switched are input to the input waveguide 12 (see FIG. 3) of the arrayed waveguide diffraction grating (AWG) 61 via the optical connector 59. The arrayed waveguide diffraction grating 61 has the input-side slab waveguide separated into the first input-side waveguide component 15A and second input-side waveguide component 15B, as shown in FIG. 3. The first to Nth output waveguides $13_1$ to $13_N$ of the arrayed waveguide diffraction grating 61 are respectively connected to the first to Nth optical power meters 631 to 63N via the first to Nth optical connectors 621 to 62N arranged in correspondence with the respective output waveguides.

In this modification as well, the first input-side waveguide component 15A of the arrayed waveguide diffraction grating 61 is fixed on a stationary member (not shown), whereas the second input-side waveguide component 15B can be moved freely by the moving mechanism 65 in the cutting direction 66 with respect to the first input-side waveguide component 15A. A control section 367 receives light beams having the wavelengths λs and λ1 which are alternately and time-divisionally output from the two-wavelength light source 352. Note that the wavelength correction apparatus 351 of this modification is designed to perform correcting operation for the arrayed waveguide diffraction grating 61 which executes measurement of the center wavelength λ0 by the same method as that described in the above embodiment or by a different method. When correction is to be done for products of the same lot, measurement of the center wavelength λ0 may be omitted, and the same initial position as that of a preceding product may be set as an initial position.

Figure 13:
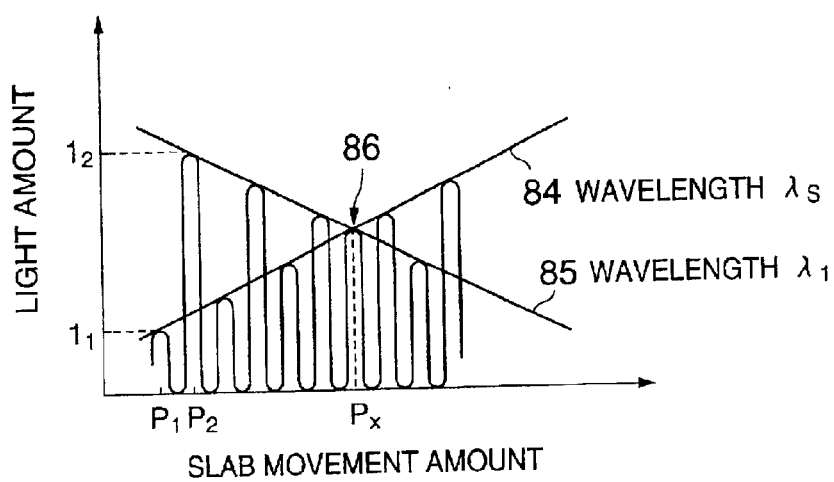
FIG. 13 is a graph for explaining the slab movement amount with respect to a target wavelength λg in this modification.

FIG. 13 corresponds to FIG. 8 in the first embodiment and shows the slab movement amount for the target wavelength λg. In this case, for the sake of illustrative convenience, the movement amount of the second input-side waveguide component 15B is set to be larger than that of the first input-side waveguide component 15A. In practice, however, the switching period of the wavelengths λs and λ1 is sufficiently short as compared with the moving speed of the second input-side waveguide component 15B.

If, for example, the two-wavelength light source 352 in FIG. 12 outputs the wavelength λs on the short wavelength side at a relative position $P_1$, a light amount $1_1$ equal in level to a characteristic line 84 at this position (slab displacement amount) is measured by the optical power meter 63. When the two-wavelength light source 352 outputs the second wavelength λ1 on the long wavelength side at a relative position $P_2$ slightly shifted from the above position, a light amount $1_2$ equal in level to a characteristic line 85 at this position is measured by the optical power meter 63. The reason why the two light amounts $1_1$ and $1_2$ do not coincide with each other in FIG. 13 is that the corresponding relative positions do not coincide with the target wavelength λg.

In contrast to this, at a position 86 (relative position $P_x$) where the characteristic line 84 representing the characteristic associated with the wavelength λs crosses the characteristic line 85 representing the characteristic associated with the wavelength λ1, when the two-wavelength light source 352 outputs the first wavelength λs on the short wavelength side and the second wavelength λ1 on the long wavelength side, the optical power meter 63 measures the same light amount. When the second input-side wavelength component 15B further moves, the above two light amounts differ from each other again. In this modification, therefore, the control section 367 compares the light amount based on the first wavelength λs on the short wavelength side with the light amount based on the second wavelength λ1 on the long wavelength side, and sets the position where they coincide with each other as a position where the relative position coincides with the wavelength λg.

According to this modification, measurement based on the two wavelengths λs and λ1 is completed by one scanning operation. In addition, whether the current position moves toward or away from the target wavelength λg at the middle point between the two wavelengths λs and λ1 can be determined by checking whether the difference between the light amounts based on the wavelengths λs and λ1 increases or decreases upon movement of the second input-side waveguide component 15B (or the first input-side waveguide component 15A). Therefore, measurement of the center wavelength λ0 of light or setting of an initial position in step S102 in the above embodiment can be roughly done to a certain extent. This also allows the use of an efficient measurement method, e.g., performing coarse measurement when the difference between the light amounts based on the two wavelengths λs and λ1 is large, and fine measurement when the difference decreases. Consequently, the measurement time can be further shortened, and the measurement precision can be improved.

In addition, in this modification, since the two-wavelength light source 352 for outputting the two fixed wavelengths λs and λ1 is used, the wavemeter (OWM) 58 in the first embodiment is not required. This is because there is no need to perform feedback or measurement of wavelengths.

Second Embodiment

With an increase in the volume of data transmitted, a demand has arisen for an increase in the transmission capacity of an optical fiber communication system, and a great deal of attention has been paid to DWDM (Dense Wavelength Division Multiplexing). If, however, all optical parts are made to comply with predetermined specifications based on advanced wavelength multiplexing in constructing a communication system, some parts cause great increases in cost or a decrease in yield. In order to solve such a problem, a part called an interleaver is used.

Figure 14:
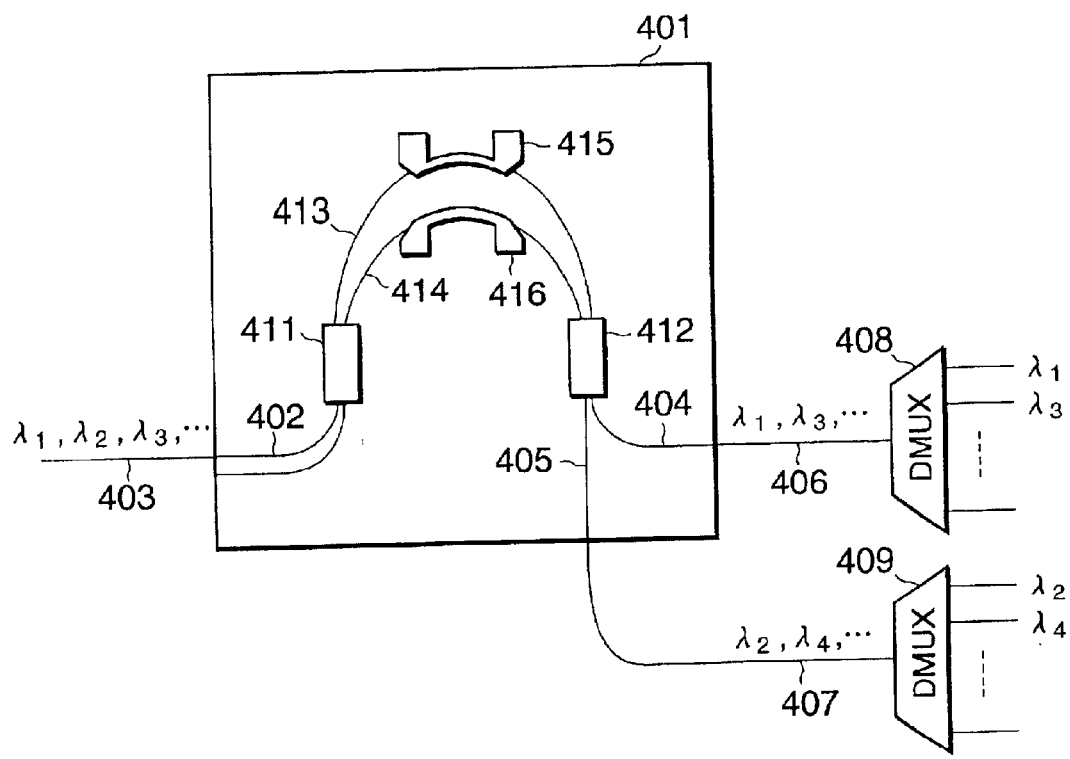
FIG. 14 is a schematic view showing the arrangement of an interleaver subjected to correction in the second embodiment of the present invention and the main part of a signal processing apparatus using the interleaver.

FIG. 14 shows an interleaver and the main part of a signal processing apparatus using it. An interleaver 401 is an optical part for distributing signal light components 403 input to an input waveguide 402 into two output waveguides 404 and 405 on a wavelength basis. If, for example, the signal light components 403 having wavelengths λ1, λ2, λ3, λ4, . . . are input from the input waveguide 402, signal light components 406 having the odd-numbered wavelengths λ1, λ3, . . . are output from the first output waveguide 404. Signal light components 407 having the even-numbered wavelengths λ2, λ4, . . . are output from the second output waveguide 405. Therefore, for example, the intervals between the wavelengths of these signal light components 406 and 407 after demultiplexing become twice those between those between the wavelengths of the respective signal light components which are multiplexed. For this reason, if optical demultiplexers (DMUXs) 408 and 409 are to be arranged on the output side for the respective wavelengths, relatively inexpensive optical parts can be used as them.

The interleaver 401 has 3-dB (decibel) couplers 411 and 412 between the input waveguide 402 and first and second output waveguides 404 and 405. First and second optical waveguides 413 and 414 having different optical path lengths are arranged between these 3-dB couplers 411 and 412 to demultiplex signal components having odd- and even-numbered wavelengths. First and second heating plates 415 and 416 are placed midway along the first and second optical waveguides 413 and 414 to properly demultiplex wavelengths in accordance with the signal light components 403 to be used. By properly applying heat pulses using these heating plates and 415 and 416, the wavelength characteristics of the interleaver 401 can be changed. In the second embodiment of the present invention, efficient wavelength correction is performed for this interleaver 401.

Figure 15:
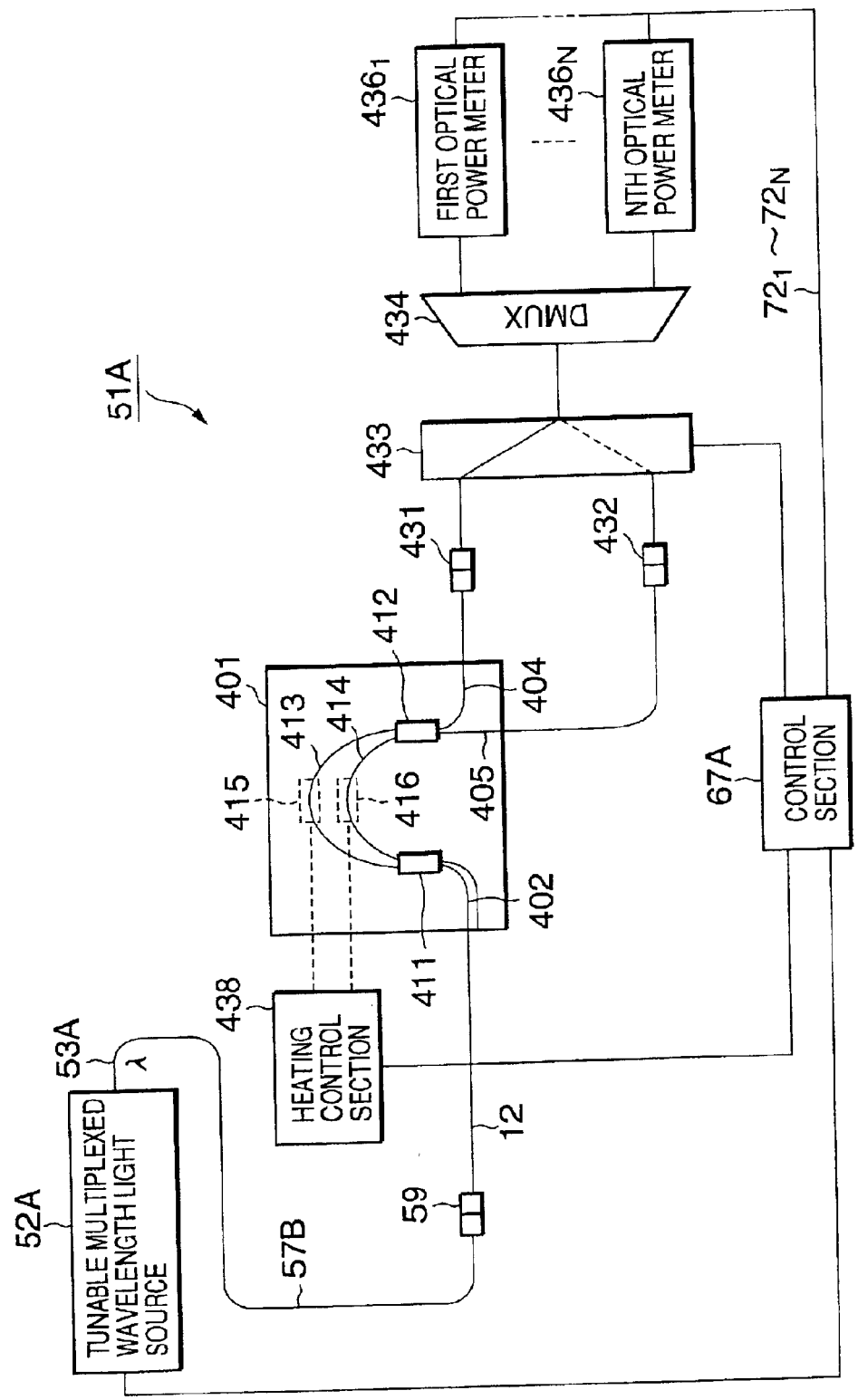
FIG. 15 is a block diagram showing the arrangement of a wavelength correction apparatus for correcting the wavelength of the interleaver in the second embodiment.

FIG. 15 shows the arrangement of a wavelength correction apparatus for correcting the wavelength of such an interleaver. The same reference numerals as in FIG. 4 denote the same parts in FIG. 15, and a description of a wavelength correction apparatus 51A will be properly omitted. An optical connector 59 to which multiplexed light 53A output from a tunable multiplexed wavelength light source 52A is input is connected to the input waveguide 402 of the interleaver 401 via an input waveguide 12. The two output waveguides 404 and 405 of the interleaver 401 are connected to a switch circuit 433 via optical connectors 431 and 432. One of these output waveguides is selected and connected to an optical demultiplexer (DMUX) 434. The optical demultiplexer 434 has an arrangement similar to that of the optical demultiplexers 408 and 409 and is designed to demultiplex input multiplexed light on a wavelength basis.

Optical power meters $436_1$ to $436_N$ for measuring the output light amounts of the respective wavelength components are arranged on the output side of the optical demultiplexer 434. Power detection signals $72_1$ to $72_N$ from the optical power meters $436_1$ to $436_N$ are concurrently input to a control section 67A. The control section 67A controls the output from the tunable multiplexed wavelength light source 52A. The control section 67A also controls a heating control section 438. The heating control section 438 is designed to change the characteristics of the first and second optical waveguides 413 and 414 by controlling energization of the heating plates 415 and 416. The wavelength correction apparatus 51A may also control heating operation for the 3-dB couplers 411 and 412 shown in FIG. 14. Note that the above characteristics can be changed by ultraviolet irradiation instead of such heating control.

In the wavelength correction apparatus having this arrangement, the interleaver 401 to be corrected is connected to the incident side and exit side inside the apparatus via the optical connectors 59, 431, and 432. The control section 67A then controls the switch circuit 433 to connect an arbitrary one of the two output waveguides 404 and 405 to the optical demultiplexer 434. In this state, the control section 67A performs control to output wavelengths $\lambda1-\Delta\lambda$, $\lambda2-\Delta\lambda$, $\lambda3-\Delta\lambda$, $\lambda4-\Delta\lambda$, ... set by shifting the respective wavelengths $\lambda1$, $\lambda2$, $\lambda3$, $\lambda4$, ... output from the tunable multiplexed wavelength light source 52A from the respective target values to the short wavelength side by a predetermined wavelength $\Delta\lambda$. In this state, the control section 67A measures the power detection signals $72_1$ to $72_N$ output from the optical power meters $436_1$ to $436_N$ and performs control to output iwavelengths $\lambda1+\Delta\lambda$, $\lambda2+\Delta\lambda$, $\lambda3+\Delta\lambda$, $\lambda4+\Delta\lambda$, ... set by shifting the respective wavelengths $\lambda1$, $\lambda2$, $\lambda3$, $\lambda4$, ... output from the respective target values to the long wavelength side by the predetermined wavelength $\Delta\lambda$. In this case as well, the power detection signals $72_1$ to $72_N$ output from the optical power meters $436_1$ to $436_N$ are measured.

The control section 67A then instructs the heating control section 438 to control energization of the heating plates 415 and 416 while alternately switching wavelengths on the short wavelength side and the long wavelength side such that the outputs from the optical power meters $436_1$ to $436_N$ with respect to these two wavelengths approximate most for the respective wavelengths. The above control is done with reference to one of the output waveguides 404 and 405 which is initially selected by the switch circuit 433. Obviously, however, the interleaver 401 may be adjusted to optical characteristics for all the wavelengths by alternately switching the output waveguides 404 and 405 using the switch circuit 433.

Third Embodiment

Figure 16:
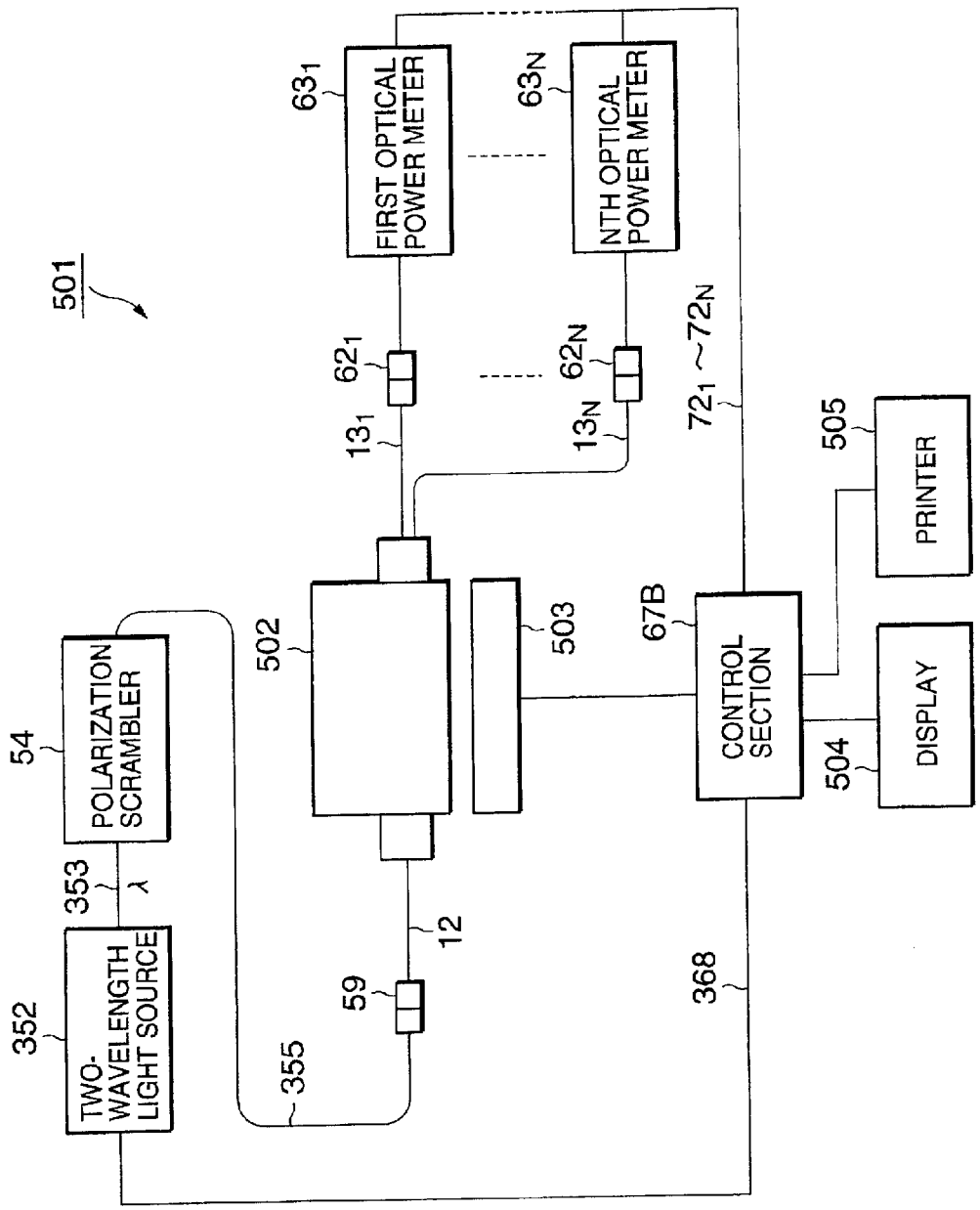
FIG. 16 is a block diagram showing the arrangement of a wavelength check apparatus according to the third embodiment of the present invention.

FIG. 16 shows the arrangement of a wavelength check apparatus according to the third embodiment of the present invention. The same reference numerals as in FIG. 12 denote the same parts in FIG. 16, and a description thereof will be properly omitted. A wavelength check apparatus 501 is an apparatus for checking whether a check target 502 such as an arrayed waveguide diffraction grating complies with required specifications. In the wavelength check apparatus 501, the input and output sides of the check target 502 are respectively connected to optical connectors 59 and 62. A check target discriminating unit 503 is formed from, e.g., a bar code reader and discriminates the manufacturer's serial number of each check target 502. The discrimination result is input to a control section 67B.

When the check target 502 is connected to the optical connector 59 and first to Nth optical connectors $62_1$ to $62_N$, the control section 67B automatically discriminates the manufacturer's serial number through the check target discriminating unit 503 and starts a check. In this check, light components having two different wavelengths which are shifted from a reference wavelength to the short and long wavelength sides by the same wavelength are alternately output from a two-wavelength light source 352, and it is checked whether the output levels of first to Nth optical power meters $63_1$ to $63_N$ for the respective wavelengths fall within an allowable range. The check results are displayed on a display 504 in correspondence with the respective wavelengths in the respective output waveguides (not shown). In addition, a check result indicating pass/fail information or the like is printed out by a printer 505 in correspondence with the manufacturer's serial number. This makes it possible to check whether the center wavelength of the check target 502 complies with a required specification and check a large number of check targets within a short period of time.

Each of the above embodiments and modification has exemplified the wavelength correction apparatus in which the input-side slab waveguide of the arrayed waveguide diffraction grating (AWG) is divided into two input-side waveguide components. However, the present invention is not limited to this. The present invention can be equally applied to wavelength correction in a case wherein the output-side slab waveguide is divided into two output-side waveguide components.

What is claimed is:

1. A wavelength correction method in a slab waveguide formed as one waveguide as a whole by combining two waveguide components with a predetermined end face which is so formed on one waveguide component as to cross an optical axis being placed to oppose an end face which is so formed on the other waveguide component so as to be parallel with the predetermined end face, or a slab waveguide assembly formed by connecting another waveguide to the slab waveguide, comprising:

the first-wavelength-based measurement step of causing a light component having a first wavelength $\lambda 1$ shifted from a target center wavelength $\lambda g$ by a predetermined wavelength to be incident from the waveguide component placed on an incident side, and at the same time, measuring a level of a light component output at each movement position while moving at least one of the two waveguide components in a direction crossing the optical axis;

the second-wavelength-based measurement step of causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the two waveguide components at each movement position while moving at least one of the two waveguide components in the direction crossing the optical axis;

the coincident position discrimination step of discriminating a relative movement position of the two waveguide components at which the level of the light component obtained in the first-wavelength-based measurement step coincides with the level of the light component obtained in the second-wavelength-based measurement step; and the final correction step of fixing a positional relationship between the two waveguide components in the direction crossing the optical axis to the relative movement position discriminated in the coincident position discrimination step in order to complete correction for the center wavelength $\lambda g$.

2. A method according to claim 1, wherein an interval between the first and second wavelengths $\lambda 1$ and $\lambda 2$ is a full-width at half-maximum of a spectrum, and a middle point between the wavelengths coincides with the wavelength $\lambda g$.

3. A method according to claim 1, wherein another slab waveguide is connected to an output side of the slab waveguide via a channel waveguide array, and in the final correction step, measurement is done to obtain a relative positional relationship between the slab waveguide and the another slab waveguide connected to the output side of the slab waveguide on the basis of levels of light components output from the two slab waveguides, and the positional relationship between the two slab waveguides is fixed on the basis of the measurement result in order to terminate correction for the center wavelength $\lambda g$.

4. A wavelength correction apparatus in a slab waveguide formed as one waveguide as a whole by combining two waveguide components with a predetermined end face which is so formed on one waveguide component as to cross an optical axis being placed to oppose an end face which is so formed on the other waveguide component so as to be parallel with the predetermined end face, or a slab waveguide assembly formed by connecting another waveguide to the slab waveguide, comprising:

first-wavelength-based measurement means for causing a light component having a first wavelength $\lambda 1$ shifted from a target center wavelength $\lambda g$ by a predetermined wavelength to be incident from the waveguide component placed on an incident side, and at the same time, measuring a level of a light component output at each movement position while moving at least one of the two waveguide components in a direction crossing the optical axis;

second-wavelength-based measurement means for causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the two waveguide components at each movement position while moving at least one of the two waveguide components in the direction crossing the optical axis;

coincident position discrimination means for discriminating a relative movement position of the two waveguide components at which the level of the light component obtained by said first-wavelength-based measurement means coincides with the level of the light component obtained by said second-wavelength-based measurement means; and final correction means for fixing a positional relationship between the two waveguide components in the direction crossing the optical axis to the relative movement position discriminated in the coincident position discrimination step in order to complete correction for the center wavelength $\lambda g$.

5. An apparatus according to claim 4, wherein an interval between the first and second wavelengths $\lambda 1$ and $\lambda 2$ is a full-width at half-maximum of a spectrum, and a middle point between the wavelengths coincides with the wavelength $\lambda g$.

6. An apparatus according to claim 4, wherein another slab waveguide is connected to an output side of the slab waveguide via a channel waveguide array, and in said final correction means, measurement is done to obtain a relative positional relationship between the slab waveguide and the another slab waveguide connected to the output side of the slab waveguide on the basis of levels of light components output from the two slab waveguides, and the positional relationship between the two slab waveguides is fixed on the basis of the measurement result in order to terminate correction for the center wavelength $\lambda g$.

7. A wavelength correction method in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising:

the center wavelength measurement step of causing light having a predetermined wavelength width to be incident from a waveguide component placed on an incident side, and measuring a center wavelength $\lambda 0$ of light which has passed through a predetermined optical part connected to a waveguide component placed on an exit side;

the first-wavelength-based measurement step of causing a light component having a first wavelength $\lambda 1$ shifted from a target center wavelength λg by a predetermined wavelength to be incident from the waveguide component placed on the incident side, and at the same time, measuring a level of a light component output at each movement position while moving at least one of the two waveguide components in a direction crossing the optical axis;

the second-wavelength-based measurement step of causing a light component having a second wavelength λ2 symmetrical to the first wavelength λ1 with respect to the center wavelength λg to be incident from the waveguide component placed on the incident side, and at the same time, measuring a level of a light component output via the two waveguide components at each movement position while moving at least one of the two waveguide components in the direction crossing the optical axis;

the coincident position discrimination step of discriminating a relative movement position of the two waveguide components at which the level of the light component obtained in the first-wavelength-based measurement step coincides with the level of the light component obtained in the second-wavelength-based measurement step; and the final correction step of fixing a positional relationship between the two waveguide components in the direction crossing the optical axis to the relative movement position discriminated in the coincident position discrimination step in order to complete correction for the center wavelength λg.

8. A method according to claim 7, wherein an interval between the first and second wavelengths λ1 and λ2 is a full-width at half-maximum of a spectrum, and a middle point between the wavelengths coincides with the wavelength λg.

9. A wavelength correction method in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising:

the center wavelength measurement step of causing light having a predetermined wavelength width to be incident from a waveguide component placed on an incident side, and measuring a center wavelength λ0 of light which has passed through a predetermined optical part connected to a waveguide component placed on an exit side;

the temporary correction step of obtaining a difference between the center wavelength λ0 obtained by measurement in the center wavelength measurement step and a target center wavelength λg, and temporarily moving at least one of the two waveguide components to a relative position where the center wavelength λg is to be obtained in a direction crossing the optical axis on the basis of the obtained difference;

the first-wavelength-based measurement step of causing a light component having a first wavelength λ1 shifted from the center wavelength λg by a predetermined wavelength to be incident from the waveguide component placed on the incident side, and at the same time, measuring a level of a light component output at each movement position while moving at least one of the two waveguide components, relative to the position to which the waveguide component has been moved in the temporary correction step, in a direction crossing the optical axis;

the second-wavelength-based measurement step of causing a light component having a second wavelength λ2 symmetrical to the first wavelength λ1 with respect to the center wavelength λg to be incident from the waveguide component placed on the incident side, and at the same time, measuring a level of a light component output via the two waveguide components at each movement position while moving at least one of the two waveguide components, relative to the position to which the waveguide component has been moved in the temporary correction step, in the direction crossing the optical axis;

the coincident position discrimination step of discriminating a relative movement position of the two waveguide components at which the level of the light component obtained in the first-wavelength-based measurement step coincides with the level of the light component obtained in the second-wavelength-based measurement step; and the final correction step of fixing a positional relationship between the two waveguide components in the direction crossing the optical axis to the relative movement position discriminated in the coincident position discrimination step in order to complete correction for the center wavelength λg.

10. A method according to claim 9, wherein an interval between the first and second wavelengths λ1 and λ2 is a full-width at half-maximum of a spectrum, and a middle point between the wavelengths coincides with the wavelength λg.

11. A wavelength correction method in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising:

the center wavelength measurement step of causing light in a relatively wide band to be incident from a waveguide component placed on an incident side, and measuring a center wavelength λ0 of light output via a channel waveguide array connected to an opposite side of a slab waveguide to the input-side waveguide;

the temporary correction step of obtaining a difference between the center wavelength λ0 obtained by measurement in the center wavelength measurement step and a target center wavelength λg, and temporarily moving at least one of the two waveguide components to a relative position where the center wavelength λg is to be obtained in a direction crossing the optical axis on the basis of the obtained difference;

the first-wavelength-based measurement step of causing a light component having a first wavelength λ1 shifted from the center wavelength λg by a predetermined wavelength to be incident from the waveguide component placed on the incident side, and at the same time, measuring a level of a light component output via the channel waveguide array at each movement position while moving at least one of the two waveguide components, relative to the position to which the waveguide component has been moved in the temporary correction step, in a direction crossing the optical axis;

the second-wavelength-based measurement step of causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the channel waveguide array at each movement position while moving at least one of the two waveguide components, relative to the position to which the waveguide component has been moved in the temporary correction step, in the direction crossing the optical axis;

the coincident position discrimination step of discriminating a relative movement position of the two waveguide components at which the level of the light component obtained in the first-wavelength-based measurement step coincides with the level of the light component obtained in the second-wavelength-based measurement step; and the final correction step of fixing a positional relationship between the two waveguide components in the direction crossing the optical axis to the relative movement position discriminated in the coincident position discrimination step in order to complete correction for the center wavelength $\lambda g$.

12. A method according to claim 11, wherein an interval between the first and second wavelengths $\lambda 1$ and $\lambda 2$ is a full-width at half-maximum of a spectrum, and a middle point between the wavelengths coincides with the wavelength $\lambda g$.

13. A method according to claim 11, wherein a plurality of output waveguides are connected to an output side of the channel waveguide array via another slab waveguide, and in the final correction step, measurement is done to obtain a relative positional relationship between the slab waveguide and the another slab waveguide connected to the output side of the slab waveguide on the basis of levels of light components output from the two slab waveguides, and the positional relationship between the two slab waveguides is fixed on the basis of the measurement result in order to terminate correction for the center wavelength $\lambda g$.

14. A wavelength correction apparatus in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising:

center wavelength measurement means for causing light having a predetermined wavelength width to be incident from a waveguide component placed on an incident side, and measuring a center wavelength $\lambda 0$ of light which has passed through a predetermined optical part connected to a waveguide component placed on an exit side;

first-wavelength-based measurement means for causing a light component having a first wavelength $\lambda 1$ shifted from a target center wavelength $\lambda g$ by a predetermined wavelength to be incident from the waveguide component placed on the incident side, and at the same time, measuring a level of a light component output at each movement position while moving at least one of the two waveguide components in a direction crossing the optical axis;

second-wavelength-based measurement means for causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the two waveguide components at each movement position while moving at least one of the two waveguide components in the direction crossing the optical axis;

coincident position discrimination means for discriminating a relative movement position of the two waveguide components at which the level of the light component obtained by said first-wavelength-based measurement means coincides with the level of the light component obtained by said second-wavelength-based measurement means; and final correction means for fixing a positional relationship between the two waveguide components in the direction crossing the optical axis to the relative movement position discriminated by said coincident position discrimination means in order to complete correction for the center wavelength $\lambda g$.

15. An apparatus according to claim 14, wherein an interval between the first and second wavelengths $\lambda 1$ and $\lambda 2$ is a full-width at half-maximum of a spectrum, and a middle point between the wavelengths coincides with the wavelength $\lambda g$.

16. A wavelength correction apparatus in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising:

center wavelength measurement means for causing light having a predetermined wavelength width to be incident from a waveguide component placed on an incident side, and measuring a center wavelength $\lambda 0$ of light which has passed through a predetermined optical part connected to a waveguide component placed on an exit side;

temporary correction means for obtaining a difference between the center wavelength $\lambda 0$ obtained by measurement by said center wavelength measurement means and a target center wavelength $\lambda g$, and temporarily moving at least one of the two waveguide components to a relative position where the center wavelength $\lambda g$ is to be obtained in a direction crossing the optical axis on the basis of the obtained difference;

first-wavelength-based measurement means for causing a light component having a first wavelength $\lambda 1$ shifted from the center wavelength $\lambda g$ by a predetermined wavelength to be incident from the waveguide component placed on the incident side, and at the same time, measuring a level of a light component output at each movement position while moving at least one of the two waveguide components, relative to the position to which the waveguide component has been moved by said temporary correction means, in a direction crossing the optical axis;

second-wavelength-based measurement means for causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the two waveguide components at each movement position while moving at least one of the two waveguide components, relative to the position to which the waveguide component has been moved by said temporary correction means, in the direction crossing the optical axis;

coincident position discrimination means for discriminating a relative movement position of the two waveguide components at which the level of the light component obtained by said first-wavelength-based measurement means coincides with the level of the light component obtained by said second-wavelength-based measurement means; and final correction means for fixing a positional relationship between the two waveguide components in the direction crossing the optical axis to the relative movement position discriminated by said coincident position discrimination means in order to complete correction for the center wavelength $\lambda g$.

17. An apparatus according to claim 16, wherein an interval between the first and second wavelengths $\lambda 1$ and $\lambda 2$ is a full-width at half-maximum of a spectrum, and a middle point between the wavelengths coincides with the wavelength $\lambda g$.

18. A wavelength correction apparatus in a slab waveguide formed as one waveguide as a whole by combining two waveguide components with a predetermined end face which is so formed on one waveguide component as to cross an optical axis being placed to oppose an end face which is so formed on the other waveguide component as to be parallel with the predetermined end face such that the end faces are set at an initial position as a predetermined relative positional relationship in a direction crossing the optical axis, or a slab waveguide assembly formed by connecting another waveguide to the slab waveguide, comprising:

center wavelength measurement means for causing light in a relatively wide band to be incident from a waveguide component placed on an incident side, and measuring a center wavelength $\lambda 0$ of light output via a channel waveguide array connected to an opposite side of a slab waveguide to the input-side waveguide;

temporary correction means for obtaining a difference between the center wavelength $\lambda 0$ obtained by measurement by said center wavelength measurement means and a target center wavelength $\lambda g$, and temporarily moving at least one of the two waveguide components to a relative position where the center wavelength $\lambda g$ is to be obtained in a direction crossing the optical axis on the basis of the obtained difference;

first-wavelength-based measurement means for causing a light component having a first wavelength $\lambda 1$ shifted from the center wavelength $\lambda g$ by a predetermined wavelength to be incident from the waveguide component placed on the incident side, and at the same time, measuring a level of a light component output via the channel waveguide array at each movement position while moving at least one of the two waveguide components, relative to the position to which the waveguide component has been moved by said temporary correction means, in a direction crossing the optical axis;

second-wavelength-based measurement means for causing a light component having a second wavelength $\lambda 2$ symmetrical to the first wavelength $\lambda 1$ with respect to the center wavelength $\lambda g$ to be incident from the waveguide component placed on the incident side, and at the same time, measuring a level of a light component output via the channel waveguide array at each movement position while moving at least one of the two waveguide components, relative to the position to which the waveguide component has been moved by said temporary correction means, in the direction crossing the optical axis;

coincident position discrimination means for discriminating a relative movement position of the two waveguide components at which the level of the light component obtained by said first-wavelength-based measurement means coincides with the level of the light component obtained by said second-wavelength-based measurement means; and final correction means for fixing a positional relationship between the two waveguide components in the direction crossing the optical axis to the relative movement position discriminated by said coincident position discrimination means in order to complete correction for the center wavelength $\lambda g$.

19. An apparatus according to claim 18, wherein an interval between the first and second wavelengths $\lambda 1$ and $\lambda 2$ is a full-width at half-maximum of a spectrum, and a middle point between the wavelengths coincides with the wavelength $\lambda g$.

20. An apparatus according to claim 18, wherein a plurality of output waveguides are connected to the output side of the channel waveguide array via another slab waveguide, and said final correction means performs similar measurement to obtain the positional relationship with respect to light components respectively output from the plurality of output waveguides and fixes the positional relationship on the basis of the measurement result in order to terminate correction for the center wavelength $\lambda g$.

* * * * *